United States Patent [19]
Abriam et al.

[11] Patent Number: 5,933,353
[45] Date of Patent: Aug. 3, 1999

[54] METHOD AND APPARATUS FOR COMPUTER AIDED MACHINING

[75] Inventors: Rosemary O. Abriam, San Leandro; David F. Arnone, Mountain View, both of Calif.

[73] Assignee: New Focus, Inc., Santa Clara, Calif.

[21] Appl. No.: 08/931,862

[22] Filed: Sep. 16, 1997

[51] Int. Cl.$^6$ .............................................. G05B 19/4093
[52] U.S. Cl. .............................. 364/474.24; 364/474.22; 364/474.28; 364/474.13; 364/474.21
[58] Field of Search ..................... 364/191, 192, 364/188, 468.03, 468.04, 468.13, 474.09, 470.05, 474.13, 474.15, 474.21, 474.25, 474.28; 345/348–351, 961, 964–970

[56] References Cited

U.S. PATENT DOCUMENTS

| | | | |
|---|---|---|---|
| 4,472,783 | 9/1984 | Johnstone et al. | 364/474 |
| 4,833,617 | 5/1989 | Wang | 364/474.15 |
| 5,251,142 | 10/1993 | Cramer | 364/474.13 |
| 5,297,022 | 3/1994 | Watanabe | 364/191 |
| 5,351,196 | 9/1994 | Sowar et al. | 364/474.24 |
| 5,378,218 | 1/1995 | Daimaru et al. | 483/9 |
| 5,465,215 | 11/1995 | Strickland | 364/474.22 |
| 5,526,273 | 6/1996 | Borsari et al. | 364/474.22 |
| 5,815,398 | 9/1998 | Dighe et al. | 364/474.13 X |

*Primary Examiner*—William Grant
*Assistant Examiner*—Steven R. Garland
*Attorney, Agent, or Firm*—Wilson, Sonsini, Goodrich & Rosati

[57] ABSTRACT

In an embodiment, the controller for machining parts on a work piece positioned on a numerically controllable (NC) machine includes a memory, a display and a plurality of layout processes. A job comprising multiple parts in various quantities is displayed textually as a job list of parts and quantities. The job is also displayed graphically in a scaled layout. In the scaled layout part icons corresponding to each of the parts on the job list are superimposed on a work piece icon in an arrangement corresponding to a physical part layout. Layout processes handle the location of the machine instruction records which correspond to the parts selected for the job. These processes also determine the dimension and scaling of each part icon on the basis of the machine code records for the chosen parts. The processes also handle the scaling of the work piece icon and parts icon on the display in an arrangement corresponding to an actual physical layout for the job. In another embodiment a method for machining parts from a work piece positioned on a numerically controllable (NC) machine is disclosed.

18 Claims, 18 Drawing Sheets

FIG. 6A, FIG. 6B, FIG. 6C, FIG. 6D

| 902101 | | | | |
|---|---|---|---|---|
| Offset | Start Point | Tool Path | Tool # | Tool ID |
| x.5 y.5 z.75 | x.25 y.0 z.0 | x0. y4. z.0<br>x4. y0. z.0<br>x0. y-4. z.0<br>x-4 y0. z.0 | T001 | B454967 |
| x3.5 y.5 z.75 | x.25 y.0 z.0 | x0. y4. z.0<br>x4. y0. z.0<br>x0. y-4. z.0<br>x-4 y0. z.0 | T002 | B454967 |
| x.5 y.5 z.75 | x1. y1. z.0<br>x3. y1. z.0<br>x3. y3. z.0<br>x1. y3. z.0 | x0. y0. z-.2 | T003 | B654378 |
| x3.5 y.5 z.75 | x1. y1. z.0<br>x3. y1. z.0<br>x3. y3. z.0<br>x1. y3. z.0 | x0. y0. z-.2 | T004 | B654378 |

OPTIMIZED G-CODE

| 500A | | | | | | | |
|---|---|---|---|---|---|---|---|
| 902101 | 902101 | 902101 | 902101 | 357458 | 357458 | 254837 | 254837 |
| 1 | 1 | 1 | 1 | 2 | 2 | 3 | 3 |
| 2 | 2 | 2 | 2 | 5 | 5 | 4 | 4 |
| 5 | 5 | 5 | 5 | 6 | 6 | 1 | 1 |
| 6 | 6 | 6 | 6 | | | 5 | 5 |
| | | | | | | 6 | 6 |

| 500B | | | | | | | |
|---|---|---|---|---|---|---|---|
| 902101 | 902101 | 902101 | 902101 | 357458 | 357458 | 254837 | 254837 |
| 1 | 1 | 1 | 1 | 2 | 2 | 4 | 4 |
| 2 | 2 | 2 | 2 | 5 | 5 | 1 | 1 |
| 5 | 5 | 5 | 5 | 6 | 6 | 5 | 5 |
| 6 | 6 | 6 | 6 | | | 6 | 6 |

| 500C | | | | | | | |
|---|---|---|---|---|---|---|---|
| 902101 | 902101 | 902101 | 902101 | 357458 | 357458 | 254837 | 254837 |
| 2 | 2 | 2 | 2 | 2 | 2 | 4 | 4 |
| 5 | 5 | 5 | 5 | 5 | 5 | 1 | 1 |
| 6 | 6 | 6 | 6 | 6 | 6 | 5 | 5 |
| | | | | | | 6 | 6 |

502C1, 504C1, 506C1

METHOD AND APPARATUS FOR COMPUTER AIDED MACHINING

BACKGROUND OF THE INVENTION

1. Copyright Authorization

A portion of the disclosure of this patent document contains material which is subject to copyright protection. The copyright owner has no objection to the facsimile reproduction, by anyone, of the patent disclosure, as it appears in the U.S. Patent and Trademark Office patent files or records, but otherwise reserves all copyright rights whatsoever.

2. Field of the Invention

The field of the present invention relates in general to a method and apparatus for computer aided machining. More particularly the field of the invention relates to automated layout of parts and coding of machine instructions for machining of jobs comprising multiple parts in variable quantities.

BACKGROUND

Mechanical CAD/CAM systems have been in existence for almost 20 years and were widely popularized in the late 1970s. Initially, CAD/CAM systems were used for creating detailed designs of mechanical parts and for documenting designs using annotations such as dimensions and notes. CAD/CAM systems gradually expanded to other applications such as analysis and manufacturing. As parts are designed with CAD/CAM systems, the system creates computer models of the parts. Once a part has been designed on a CAD/CAM system, numerical control (NC) tool paths can be created to automate machining of the part. NC tool paths are programs that control the operation of the machine tool as the tool cuts the part from the raw stock. A computer-aided design (CAD) system is used to create, document and analyze part models, while a computer-aided manufacturing (CAM) system is used to generate NC tool paths generated from the design model.

In a conventional machine shop small quantities imply high unit costs. Each NC program, requires tools to be installed into specific pockets of the milling machine's tool carousel. The parts must be laid out manually, and if more than one part is being produced at a time, the work offset (the X-Y coordinates on the raw aluminum plate) for each part must be calculated and that information inserted into the NC program by a skilled machinist/programmer. Typically, because of the skill level and time required to revise an NC program, part production is limited to the same layout and quantities as originally programmed. Usually, only one part type is machined at a time. Because of the time and expense associated with the setup of a new job, most production runs are in "economic order quantities," lot sizes of 200 pieces or more. This may be considerably more pieces than is required for adjust-in-time manufacturing methodology.

What is needed is a way to reduce the economic order quantities for a machine shop. What is also needed is a way to reduce the skill level associated with layout and setup of small quantity production runs.

SUMMARY OF THE INVENTION

An object of the invention, is to provide a controller for machining parts which will allow an operator to select parts for a job from a general menu.

Another object of the invention, is to provide a graphic display of a proposed layout for all the selected parts for a job superimposed on a background image of the work piece.

A further object of the invention, is to automatically convert each of the machine code records, for individual parts, into a job level machine code file, based on the proposed part layout for a job.

Still a further object of the invention, is to be able to automatically compare the tools required for a job versus the tools available on the NC machine and to make the appropriate substitutions.

In an embodiment, the controller for machining parts on a work piece positioned on a numerically controllable (NC) machine includes a memory, a display and a plurality of layout processes. The memory includes machine instruction records for each part. The machine instruction records include a part name and a dimension for the named part. A job comprising multiple parts in various quantities is displayed textually as a job list of parts and quantities. The job is also displayed graphically in a scaled layout. In the scaled layout part icons corresponding to each of the parts on the job list are superimposed on a work piece icon in an arrangement corresponding to a physical part layout. Layout processes handle the location of the machine instruction records which correspond to the parts selected for the job. These processes also determine the dimension and scaling of each, the work piece and work piece icon on the basis of the machine code records for the chosen parts. The processes also handle the scaling of the work piece icon and parts icon on the display in an arrangement corresponding to an actual physical layout for the job.

In another embodiment, a method for machining parts from a work piece positioned on a numerically controllable (NC) machine is disclosed. The method utilizes a database of machine instruction records for parts. Each record includes a part name, part dimensions, tool names and sequence for each tool required to machine the part, and a plurality of machine paths traversed by each of the tools. The method comprises the acts of:

- defining a job as a selected subset of parts and as a corresponding quantity for each part of the selected subset;
- locating the machine instruction records in the database which correspond to the selected subset of parts;
- graphically displaying a work piece icon corresponding in scale to an actual dimension of the work piece;
- determining the dimensions of each part in the job on the basis of the part dimension in the located machine instruction records;
- calculating a selected physical location on the work piece, for each part in the job; and
- graphically superimposing a scaled part icon on the work piece icon at each of the selected locations in a scaled layout approximating an actual physical layout of the job on the work piece.

BRIEF DESCRIPTION OF THE DRAWINGS

These and other features and advantages of the present invention will become more apparent to those skilled in the art from the following detailed description in conjunction with the appended drawings in which:

FIGS. 6A–D are detailed views of the part number and quantity portions of the graphical user interface of FIG. 5.

FIG. 9A–B how an example of optimized tool sequencing for the machining of more than one instance of a single part.

FIGS. 10A–F show an example of optimized tool sequencing for the machining of more than one instance of multiple parts.

DESCRIPTION

Figure 1A:
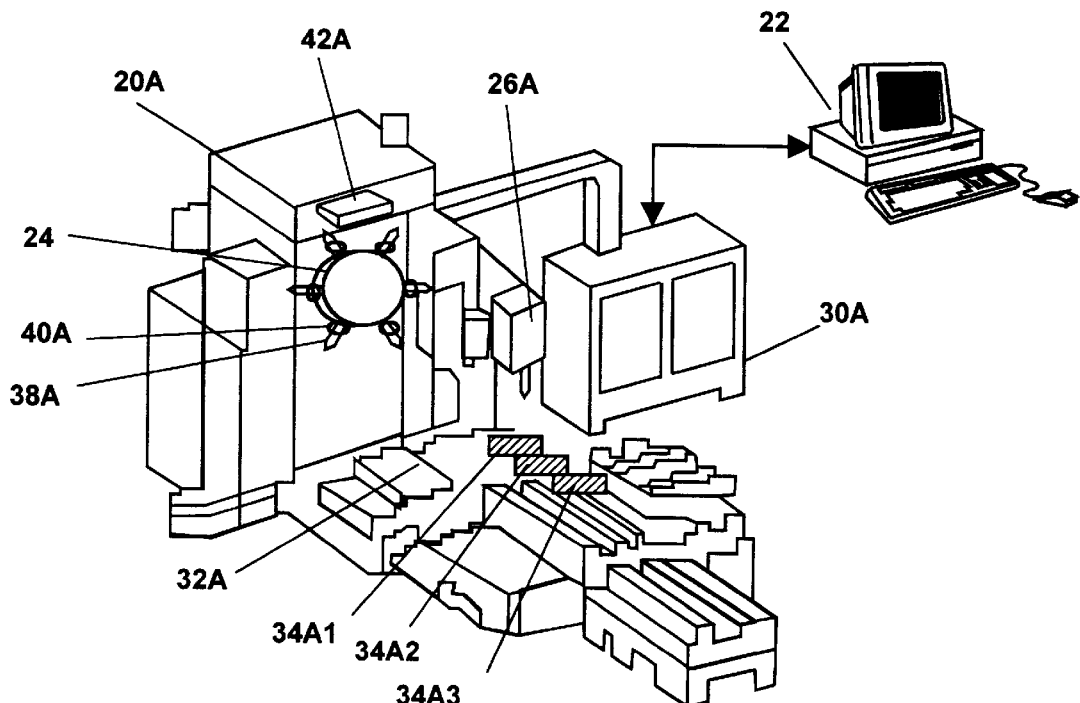
FIG. 1A shows a computer controlled single spindle milling machine.

FIG. 1A shows a computer controlled machine (CCM) according to an embodiment of the current invention. A computer 22, a single spindle milling machine 20A and three work pieces 34A1–3 are shown. The milling machine 20A comprises a single spindle 26A, a control center 30A, a tool change carousel 24, a tool identifier 42A, and an X-Y space positionable platform 32A. The tool change carousel 24 holds a number of tools of which tool 38A is referenced. Each of the tools in the tool change turret has an associated tool identification collet. Collet 40A associated with tool 38A is referenced.

In operation, machine instructions and controls are downloaded from computer 22 to control center 30A. The machine instruction for a specific job will include required sequencing of tools and tool paths. In response to a first series of instructions from computer 22, tool change carousel 24 will be rotated past tool identifier 42A. Computer 22 will identify on the basis of information obtained by tool identifier 42A, the tools currently contained in the tool carousel. That tool listing will be compared with the tools required for the job, as defined in the machine instructions from the computer 22. Those tools currently contained in the tool change carousel, that are not required for the job, will be identified via a graphical user interface (GUI) on computer 22 to the machine operator. The machine operator will be required to replace unneeded tools in tool change carousel 24 with tools which are required for the job. After these tool substitutions have been made, the computer 22 will again cause the tool change carousel 24 to rotate all tools by the tool identifier 42A to confirm that the available tools correspond to the required tools for the job. At this time the machine instructions will be updated to reflect the current location of each tool required for the job and a pocket on the tool change carousel.

The execution of a job is carried on the three work pieces 34A1–3. The three work pieces are clamped in fixed positions to the X-Y positionable milling bed 32A. Under the control of the machine instructions the appropriate tool from the tool change carousel 24 is placed in single spindle 26A. The single spindle 26A is caused to move the tool in a Z axis at the same time as the milling platform 32A is caused to traverse along a predefined path in the X-Y axis. When the operations performed by the first tool on any one or all of work pieces 34A1–3 are complete, then a tool substitution takes place. In this instance, the tool in spindle 26A is placed on tool change carousel 24 in an empty pocket thereof and the next tool required by the job is obtained from a pocket in tool change carousel 24 and placed in spindle 26A. Then the next sequence of X-Y-Z paths is executed by the combined operation of spindle 26A and machine platform 32A. At the completion of all operations, cleanup operations are performed which leave precisely defined parts within the remaining portions of work pieces 34A1–3. The material, e.g., aluminum, separating these parts is so thin as to allow the parts to be separated manually for subsequent de-burring operations. Thus a plurality of different parts can be machined in one setup from any one or all of raw material plates/ work pieces 34A1–3.

Figure 1B:
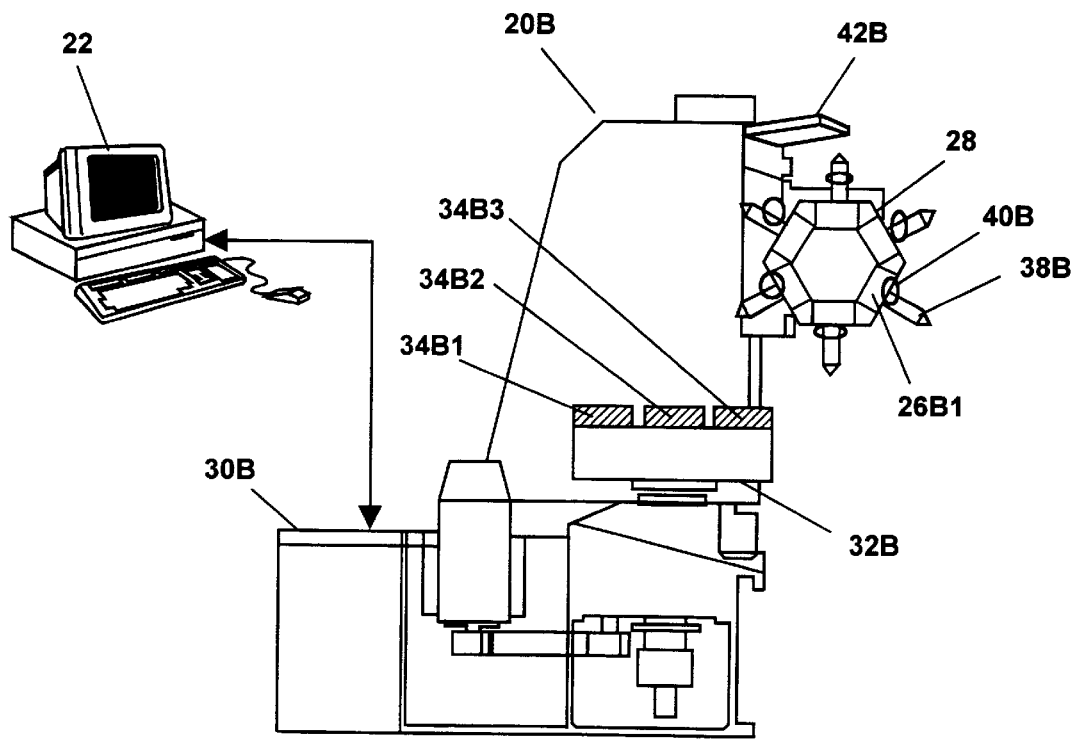
FIG. 1B shows a computer controlled multiple spindle milling machine.

FIG. 1B shows another embodiment of a CCM comprising a computer 22, a multiple spindle milling machine 20B and work pieces 34B1–3. The milling machine 20B includes a control center 30B, an X-Y positionable milling platform 32B, a multiple spindle turret 28 and a tool identifier 42B. The multiple spindle turret comprises six spindles of which spindle 26B1 is referenced. Each spindle contains a milling tool with an identification collet. Tool 38B with identification collet 40B is referenced. Each spindle applies rotational power to the tool to allow it to engage in the milling process. The turret 28 can be indexed to one of six different positions, thereby presenting a corresponding milling tool to the material to be machined. The turret 28 can index each tool by tool identifier 42B in order to obtain a readout as to the correlation between each spindle and the tool currently contained in that spindle. This identification is brought about by virtue of identification collets, i.e., collet 40B and tool reader 42B. In an embodiment of the current invention tool identification and readout is provided by "KENNAMETAL MICROLOG IDENTIFICATION SYSTEM" which comprises three parts: an ID collet, an identification head, and a control interface.

| Kennametal Model Numbers | |
| --- | --- |
| KIIK4H | 4 channel controller |
| KIRMIK | 30 mm square read head |
| KIDC50 | 12.4 mm x 7 mm code carrier |

Kennametal is located at 6015 East Randall, Los Angeles, Calif. 90040. The identification collet mounts on an individual tool. The identification collet comprises a single chip which stores a unique identification number for the tool in a coil which serves for the transfer of energy and data sufficient to identify the tool. The tool identifier 42B receives the identification number from the tool collar. The control interface processes the information, controls the data transmission, and interfaces with computer 22. Work pieces 34B1–3 are fixed to X-Y positionable platform 32B.

In operation, job instructions comprising required tools and tool paths are downloaded from computer 22 to machine controller 30B. In a preliminary process, a correlation is made between the required tools in the job code and those tools which are currently contained in the multiple spindles of turret 28. In the manner discussed above any tools contained in the spindle which are not currently required for the job are identified graphically for the user on computer 22. The user is also instructed as to which tools to place in the unused spindles. Once the tools on the spindle correlate with the tools in the job file, the actual machining operation commences. The enhanced job file contains tool path information which minimizes the number of tool changes required to machine multiple parts from any one or all of work pieces 34B1–3. As each tool is presented to the work piece, the tool turret is caused to traverse the powered spindle about the Z-axis while the work pieces are translated across the X-Y axes. Once all machining paths on all work pieces have been traversed by a single tool, the next tool is presented to the work piece by rotation of turret 28. At the conclusion of all machining operations, cleanup operations are performed. Cleanup operations comprise milling the remaining material between individual parts to a very thin cross-section. This allows the parts to be easily separated and subject to a final de-burring operation. Thus once again, as discussed above in FIG. 1A, multiple parts can be economically machined in small order quantities without the traditional penalty in terms of either setup time or operator skill being imposed.

Figure 2:
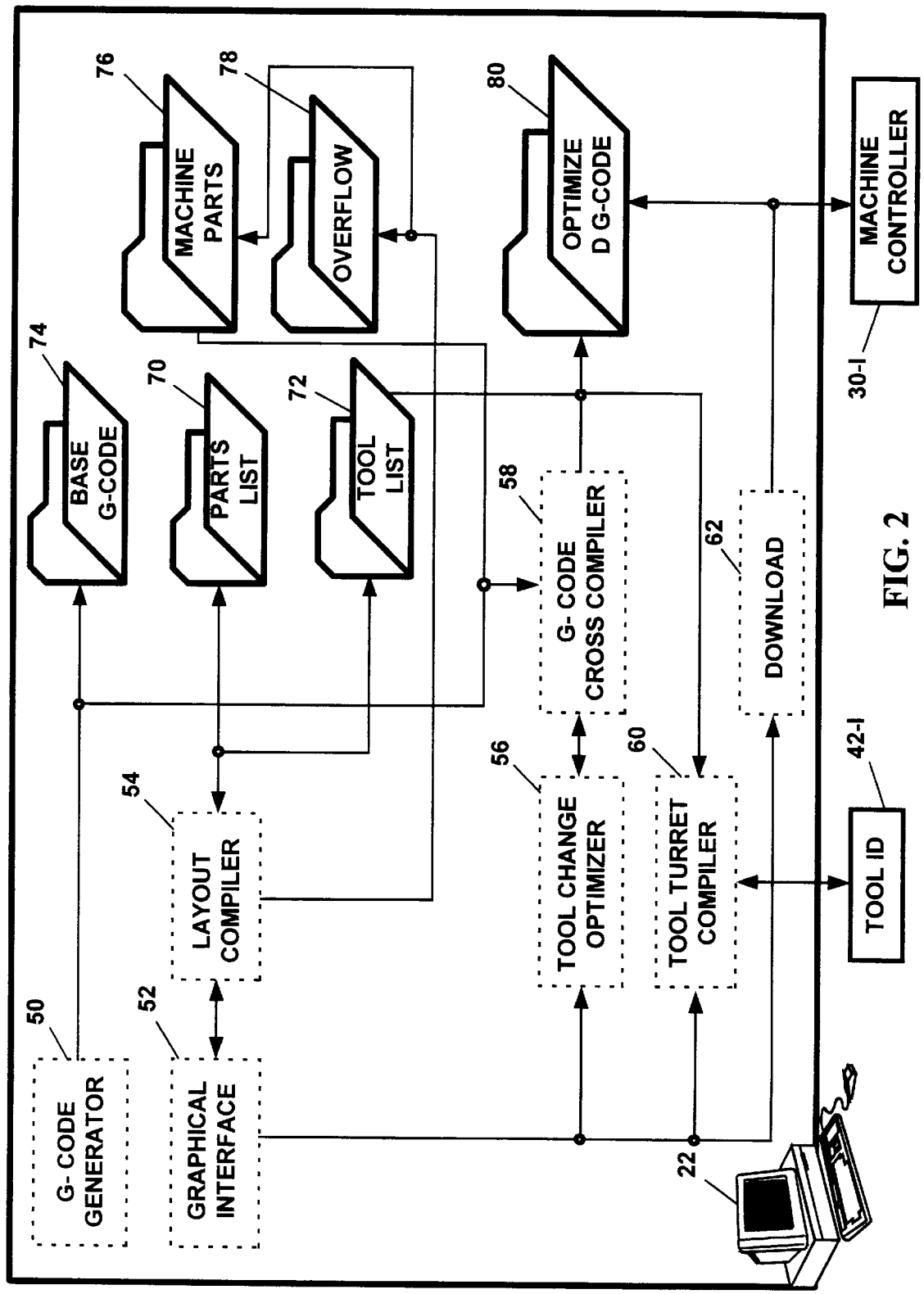
FIG. 2 shows the functional relationship between the computer implemented process modules of the current invention.

FIG. 2 is a modular block diagram of the processes and data structures associated with the current invention. Computer/processing unit 22, the tool identifier 42-I and the machine controller 30-I are identified. Within computer 22, three source files, three result files and six process modules are identified. The source files are a base G-code file 74, a parts list 70, and a tool list 72. The base G-code file contains for each part on the parts list: tool, tool path, id#, # of block units and sequencing information. The parts list contains raw stock dimensional information and tool requirements for each part. The tool list contains specifics about each tool including the identification information that will be read by either of tool identifiers 42A–B [see FIGS. 1A–B]. The result files include: a machine parts file 76, an overflow file 78 and an optimized G-code file 80. The machine parts file contains a listing of all parts that will be machined in a given job and includes the location of each part on either of work pieces 34A1–3 or 34B1–3 [see FIGS. 1A–B]. The optimized G-code file contains tool identification, tool sequencing and tool path information for all the parts in the machine parts file 76.

In operation process module 50, the G-code generator, well known in the prior art, is utilized to program for each part the path information for machining the part. Each part will have its own G-code record which will consist of tool, tool sequencing and tool cutting path information.

The remaining process modules implement the unique features of an embodiment of the current invention. Process module 52 provides a GUI to allow the user to select and layout parts; to minimize tool changes; and to correlate the tools required for a job with the tools currently available on the machine.

Graphical interface module 52 operates in conjunction with a layout compiler 54 to allow a user to select parts from the parts list 70 for a specific job. Given the dimensional information contained for each part in the parts list, the layout compiler is able to visually display a proposed location for a selected part on a work piece via a graphical interface 52. The layout compiler also keeps track of the layout area and tooling requirements for the chosen parts. As each part and part quantity is chosen by the operator, the layout compiler notifies the user if the number of parts selected exceeds the area available on the work pieces or the number of tools required to machine the part exceeds the holding capacity of the carousel/spindles. Once a job has been defined, the layout compiler 54 creates the machine parts list 76. For those parts which cannot be made as part of this session, either due to area or tool limitations, an overflow file 78 is created. The parts layout GUI is shown in the following FIGS. 5–7. The data structures associated with files 70–74 are shown in the following FIG. 4.

After a job has been defined by the creation of a machine parts file 76 the user may then minimize machine time by enabling tool change optimizer module 56 and G-code cross compiler 58. The tool optimizer utilizes the tools list file 72 and the portion of the base G-code file 74 which contains the G-code for the specific parts in the machine parts list 76. The tool change optimizer minimizes the number of tool changes during machining, by utilizing each tool on as many of the parts as possible, provided only that the use of the tool does not violate tool sequencing for any part. The complexities of tool sequencing and order are described and discussed in detail in FIGS. 10A–F and 11D. When the tool change optimizer has completed its processes the results are passed to G-code cross compiler 58. The G-code cross compiler takes the base G-codes associated with each machine part and puts together an optimized G-code file 80 for all the parts in the job/machine parts file. The optimized G-code reflects the changes in tool utilization brought about by the tool optimization process.

Utilizing graphical interface module 52, the user also conducts a computer controlled correlation of the tools listed in conjunction with the machine parts file 76 versus the tools currently contained in the carousel/spindles. This inquiry is conducted by enabling tool turret compiler 60, which interfaces with the tool ID interface 42-I. The tool ID interface is the control portion of either of the tool identifiers 42A–B [see FIGS. 1A–B]. The carousel pocket and/or spindle pocket associated with tools that are not required for the current job is presented to the user. Via a GUI 52, the user is informed which tool to insert in the pocket. When the user indicates that all appropriate tool changes have been made, a confirmation routine is performed in which all tools are indexed by the tool identifiers 42A–B. Then the tool ID interface 42-I passes tool IDs to the tool turret compiler. The turret compiler confirms the correlation of the actual tools on the machine with those tools required for the job and identified in the machine parts list 76. This updated tool and pocket information is passed to the G-code cross compiler 58 for editing optimized G-Code 80.

Finally, when the layout has been selected, when tool change-overs have been minimized, when the correlation between tools required and tools actually present on the machine has been made; then the user may enable downloader 62. Downloader 62 takes the optimized G-code file 80, and passes it to the machine via machine controller interface 30-I.

Figure 3A:
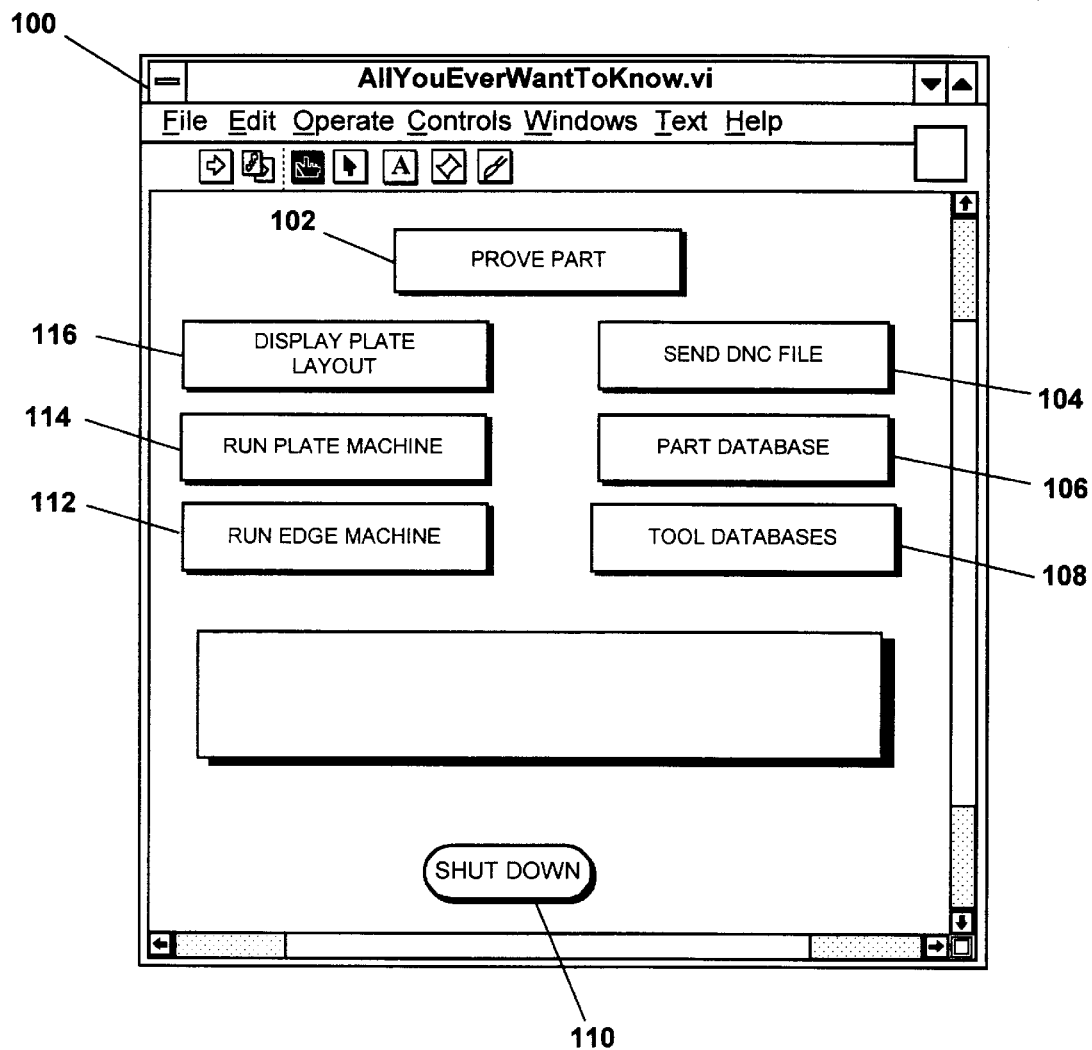
FIGS. 3A–C show the graphical user interfaces for setting up parts according to the current invention.

FIG. 3A is an entry level GUI according to an embodiment of the current invention. GUI 100 includes buttons 102–116. Button 106 accesses the parts list 70 [see FIG. 2]. Button 108 accesses the tool list 72 [see FIG. 2]. Button 102 enables the machine instructions for a single part to be downloaded from a record in the base G-code file 74 [see FIG. 2] to a machine for prototyping and proofing of a single part. Button 116 enables the layout compiler 54 [see FIG. 2]. Button 104 enables the download module 62 [see FIG. 2]. Buttons 112–114 set a specific machine to which a file has been downloaded into operation. Button 110 shuts off a specific machine.

Figure 3B:
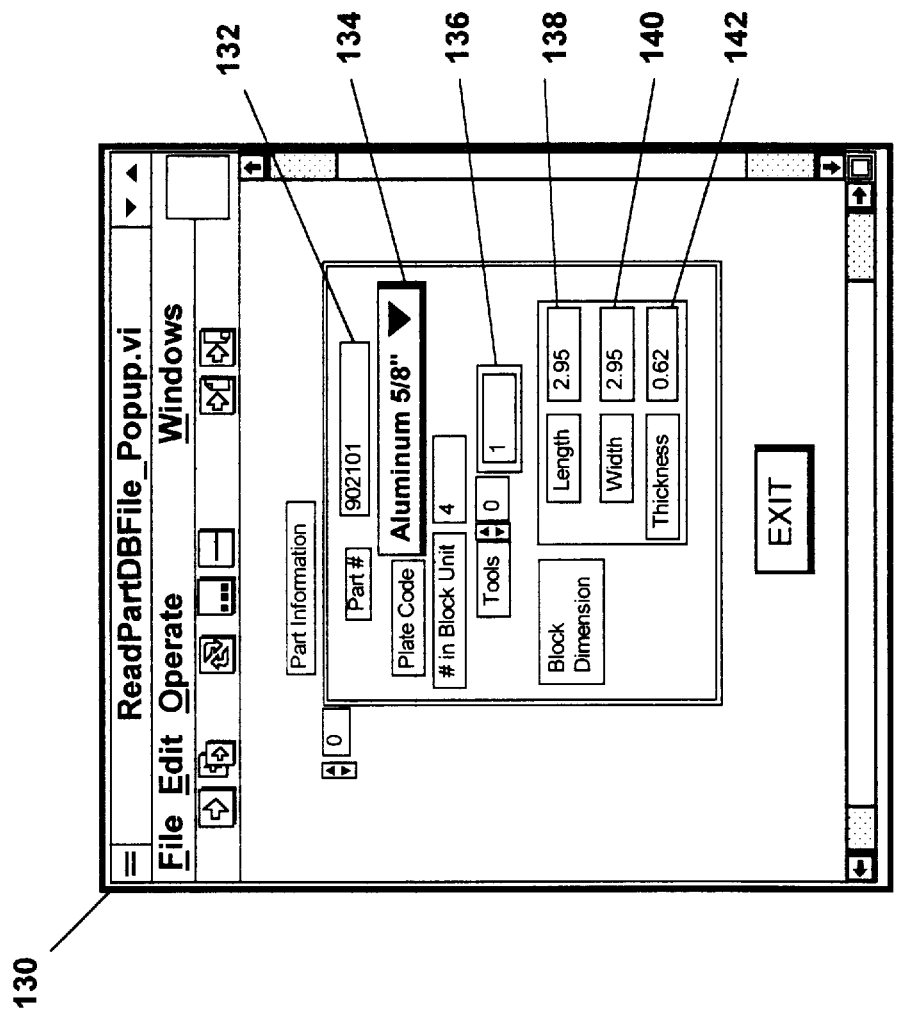

FIG. 3B is the GUI accessed via button 106 [see FIG. 3A] and corresponding to a record entry in the parts list 70 [see FIG. 2]. GUI interface 130 is shown. That interface includes fields 132–142. Part ID is placed in field 132. The preferred plate thickness for the raw stock from which the part should be machined is contained in field 134. The tools associated with the machining of a specific part are contained in scrollable window 136. The length, width and thickness of the raw material stock from which a part will be made are contained in respectively fields 138–142.

Figure 3C:
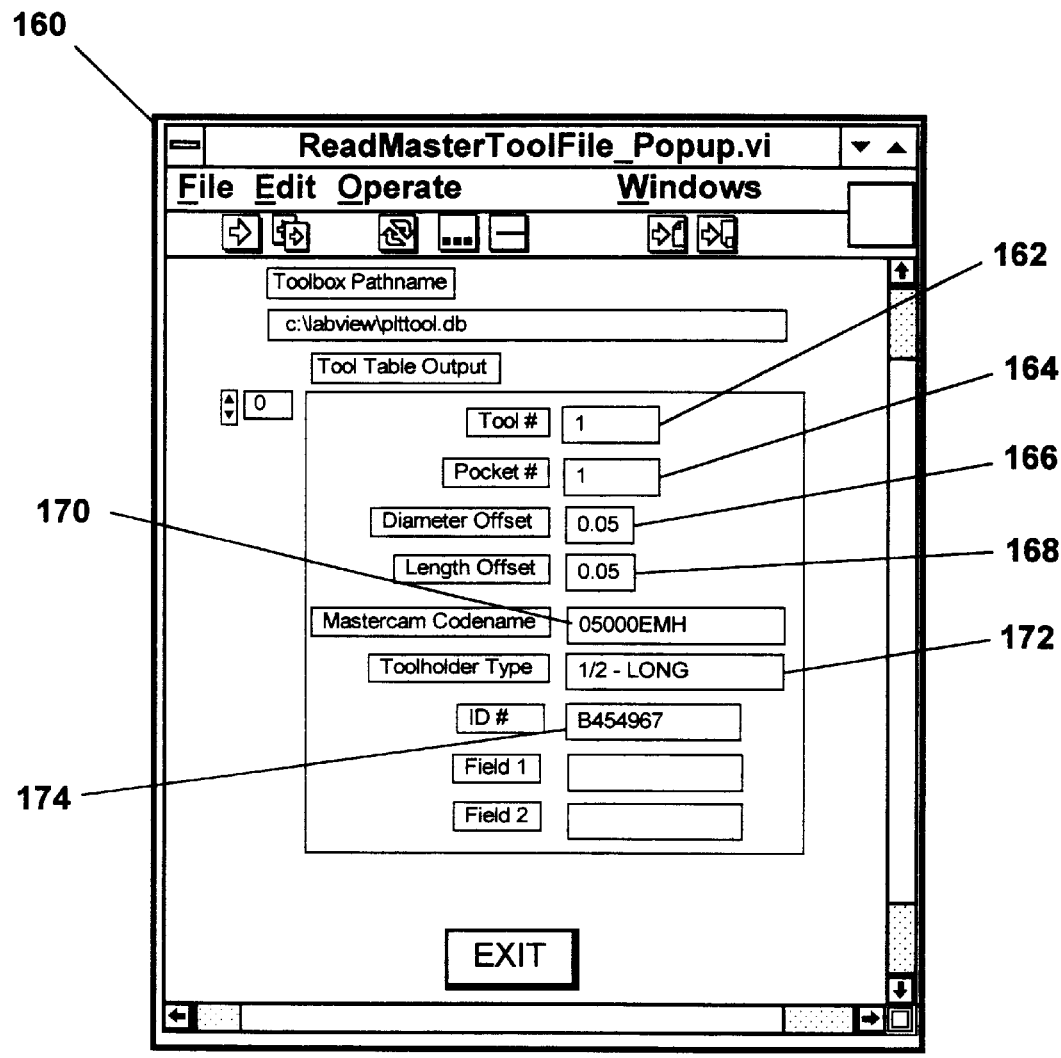

FIG. 3C shows the GUI accessed via button 108 [see FIG. 3A]. GUI 160 displays a record within a tool list 72 [see FIG.

2]. Field 162 contains the tool number which represents a specific tool identifier used in any base G-code 74 file. Each tool record contains, a tool-to-pocket correlation that currently exists. Thus, field 164 lists the pocket number associated with the placement of the tool on the machine. A pocket number thus either corresponds to the carousel pocket or turret pocket in which the tool is located. [see FIGS. 1A–B]. Fields 166–168 indicate respectively the positioning of the tool with respect to the whole spindle in terms of offset diameter and offset length. Field 170 indicates the master cam code name for the tool. This code name is a short-hand identifier for the specific tool (e.g., 05000EMH refers to a ½ inch (05000), End Mill Hog (EMH). Field 172 indicates the type of tool holder used to hold the specific tool. Finally, field 174 indicates the manufacturer's unique identifier associated with the collar of the tool. As will be explained in greater detail in FIGS. 10A–F, 11D the tool turret compiler 60 [see FIG. 2] cross-correlates the tool sequencing called for in the optimized G-code 80 [see FIG. 2] with the actual placement of tools on the carousel/spindle. Thus, it is not necessary in the current invention that the relationship set forth between a specific pocket, i.e., carousel or spindle, and a tool be maintained in order to complete the machining of a job. Rather, the tool turret compiler allows the required tools for the job to be placed in any order on the carousel and corrects the optimized G-code 80 [see FIG. 2] accordingly.

Figure 4:
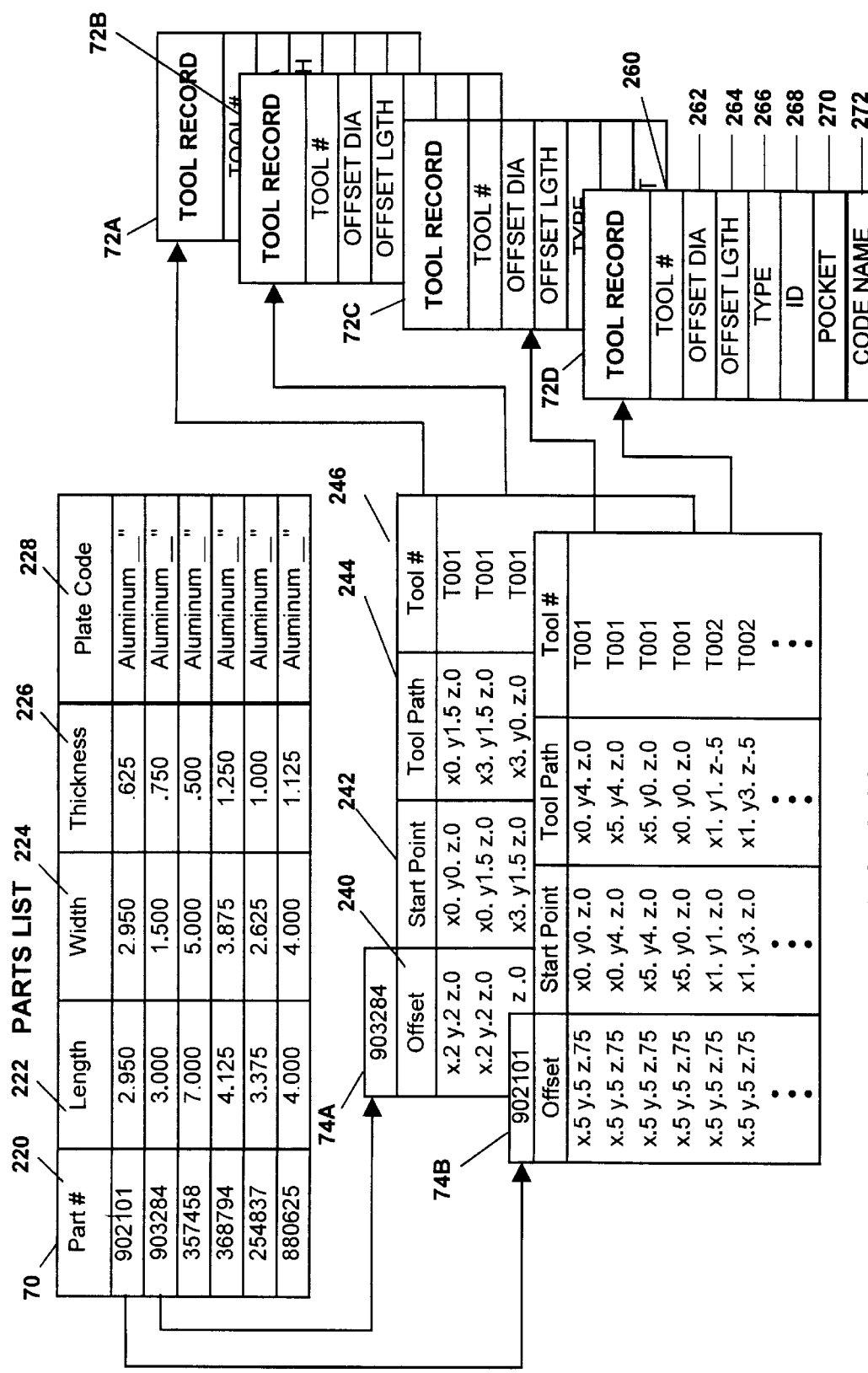
FIG. 4 shows three data structures associated with the current invention.

FIG. 4 shows the data structures for individual records within the parts list 70, the tool list 72, and the base G-code 74 files [see FIG. 2]. Base G-code records 74A–B, and tool records 72A–D are shown. The parts list 70 comprises rows of information, with each row corresponding to a record for a part. Each record/row comprises a part number field 220. Associated with the part number field are dimensional fields 222–228 which list the raw material requirements in terms of length 222, width 224, and thickness 226 and material/workpiece type 228. These are the dimensions of the stock from which the part can be machined.

For each part that exists there is a corresponding base G-code record. Thus, base G-code record 74A corresponds to part number 903284. Base G-code record 74B corresponds to part number 902101. Each base G-code record includes an offset field 240, a starting point field 242, a tool path or vector field 244, a tool # field 246. The order of the path and tool entries within each base G-code record corresponds to the order in which the tool must be selected in order for the part to be properly machined. For example, for a hole that needs to be threaded it is critical that the drilling operation be accomplished before the threading operation. Similarly, for a counterbore, the through-hole must be drilled before the counter-bore is milled. Each base G-code record contains information derived from the initial programming of a skilled operator using the G-code generator 50 [see FIG. 2]. Finally, for each base G-code record, there is a corresponding set of tool records. Tool records 72A–D are shown. Each tool record includes: tool ID field 260, offset fields 262–264, type field 266, tool identifier field 268, a tool pocket field 270 and a code name field 272. Offset fields 262–264 define respectively the diameter and length offsets of the tool with respect to the tool holder. The type field 266 identifies tool holder type, i.e., mill, drill, tap, etc. The tool pocket field 270 defines the last known specific pocket on the carousel or spindle in which the tool was found. As was discussed above, the initial base G-code relationship between a tool and a pocket is no longer a constraint in the machining of parts according to the current invention. Instead, as mentioned above, the correlation between the required tools for a job and their actual physical position in a carousel or turret, is determined by the tool turret compiler 60 [see FIG. 2] and that information is used to update the optimized G code file 80 [see FIG. 2]. The code name field 272 contains the Serial number identification for each tool.

Figure 5:
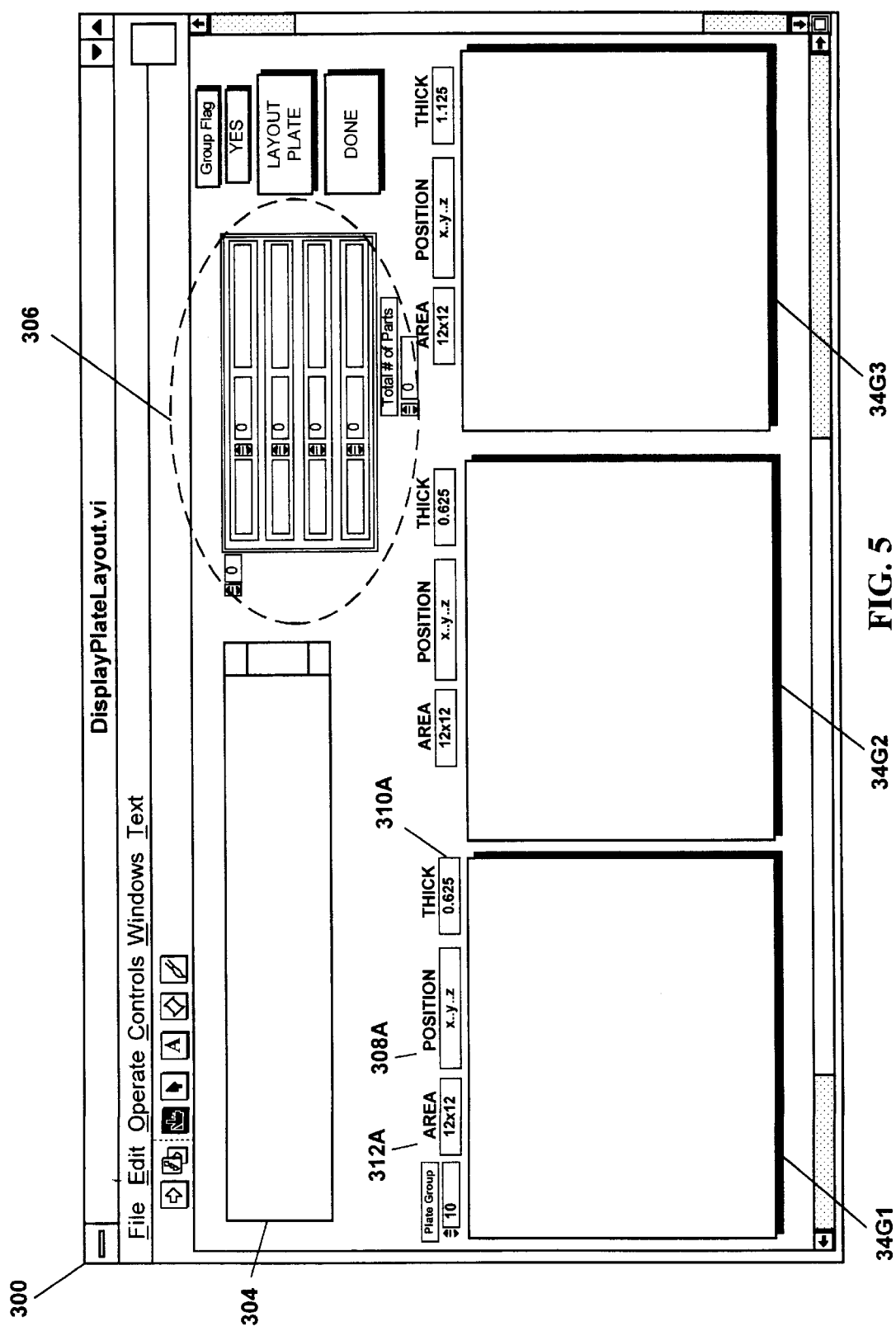
FIG. 5 shows the graphical user interface for job layout.

FIG. 5 shows the GUI enabled by button 116 [see FIG. 3A]. This interface is associated with the automated layout feature of the current invention. The interface 300 includes: a comment field 304; part number and quantity selection fields 306; and work piece location icon 34G1–3. Each work piece icon has dimensions which are identical in scale to the dimensions of the actual work piece on the machine. For example, if the first work piece on the machine is 12"×12" then the work piece location icon 34G1 would have equal length and width dimension. The scaling of the icon and the automated placement of parts in each work piece icon is determined by area, position, and thickness fields associated with each work piece location icon.

For work piece icon 34G1, the area field 312A contains the length and width for the first work piece. The position field 308 is the entry point for the offset of a reference point on the work piece, e.g., the upper left corner, from a known location on the machine platform. The thickness field 310A is the entry point for the thickness of the actual work piece. This information is used by the layout compiler 54 [see FIG. 2] in determining where and on what work piece to place selected parts.

Figures 6A, 6B, 6C, 6D:
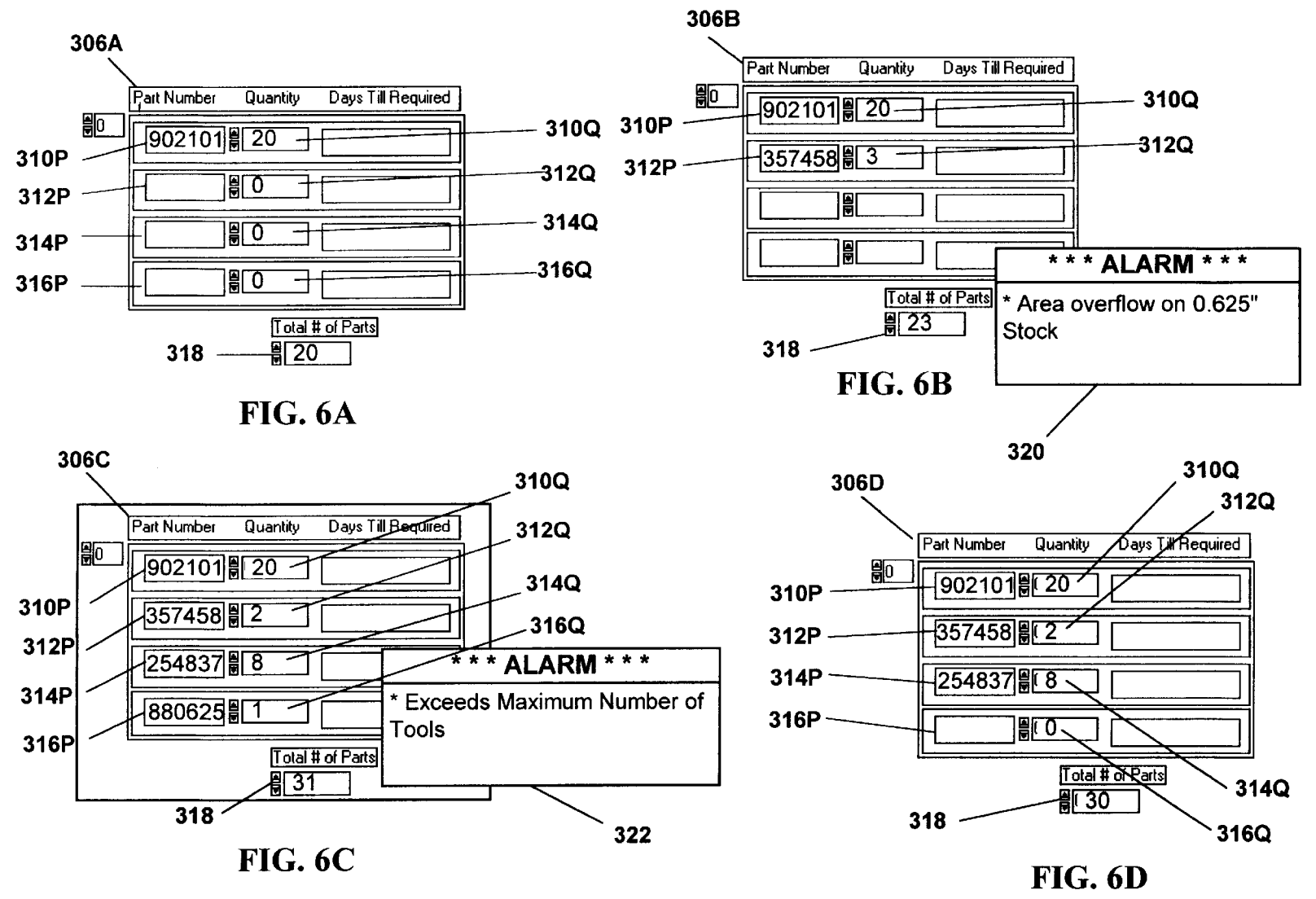

In the following FIGS. 6A–D, the selection of part number and quantity in fields 306 results in the automatic computer generated placement of part icons representing proposed part placement on work piece icons 34G1–3. These proposed placements, correspond to the actual location on the physical work piece or raw stock at which each part will be machined. FIGS. 6A–D show an example of a part number and quantity selection process performed on the part number and quantity selection fields 306 of the layout GUI 300. [see FIG. 5]. A sequence of part number and quantity selections are shown. Each of FIGS. 6A–D includes part number and quantity fields 306A–D respectively. Each of the fields 306A–D includes four part number fields, 310P–316P, and corresponding quantity fields 310Q–316Q respectively. In FIG. 6A, part number 902101 has been entered into part number field 310P in a quantity of 20 units entered into quantity field 310Q. No other part numbers or quantities have been selected. The total number of parts selected for the prospective job is totaled within field 318 which shows 20 as the total quantity of parts. In FIG. 6B, additional parts have been chosen for this specific job. Part number 357458 has been entered into part field 312P and a quantity of 3 for that part has been entered into the corresponding quantity field 312Q. The total number of parts, i.e., 23, is shown in total part window 318. In addition, an area overflow alarm with the text "Area overflow on 0.625" Stock" is displayed. As will be described in greater detail in FIG. 11A, this prompt is generated as a result of a computation performed by layout compiler 54 [see FIG. 2]. This computation is based on a correlation between the area and thickness requirements for each of the selected parts and the available work piece area and thicknesses on which to machine those parts. In this particular instance, both parts 902101 and parts 357458 can be machined from the "0.625" work pieces corresponding to icons 34G1–2 [see FIG. 5]. These work pieces are both 12" square and therefore can only accommodate 20 of part number 902101 and 2 of part number 357458. Thus alarm indicator 320 provides notice of this area overflow.

In FIG. 6C the quantity field 312Q has been reduced to 2 units of part number 357458. Thus there is no longer an area overflow condition and the area overflow alarm is no longer present. Additionally, however, part numbers 254837 and 880625 have been entered in, respectively part number fields 314P and 316P. The quantities corresponding to these parts are shown in corresponding quantity fields 314Q and 316Q. A quantity of 8 has been entered in field 314Q for part number 254837. A quantity of 1 has been entered in quantity field 316Q for part 880625. The total quantity of parts is shown in total part field 318 as 31. A tool limit alarm 322 is displayed showing that the total number of tools associated with the machining of these four different parts exceeds the maximum number of tools which can be accommodated in either the carousel 24 or the multiple spindle turret 28 shown respectively in FIGS. 1A–B. No area limits have been exceeded because it can be seen by reference to the parts list 70 in FIG. 4 that the chosen quantity of part number 254837 and part number 880625 can fit on the 1.125 inch thick work piece corresponding to work piece icon 34G3 in FIG. 5.

In FIG. 6D the part entry in field 316P and the corresponding quantity entry in field 316Q have been erased, thereby reducing the total number of parts shown in total field 318 to 30. Neither an area overflow nor a tool limit alarm is present. This indicates, therefore, that computationally, the three parts shown, i.e., 902101, 357458, and 254837 in the enumerated quantities respectively 20, 2 and 8, can be produced from the work pieces currently positioned on the machining platform and shown graphically in work piece icons 34G1–3 of FIG. 5.

Figure 7:
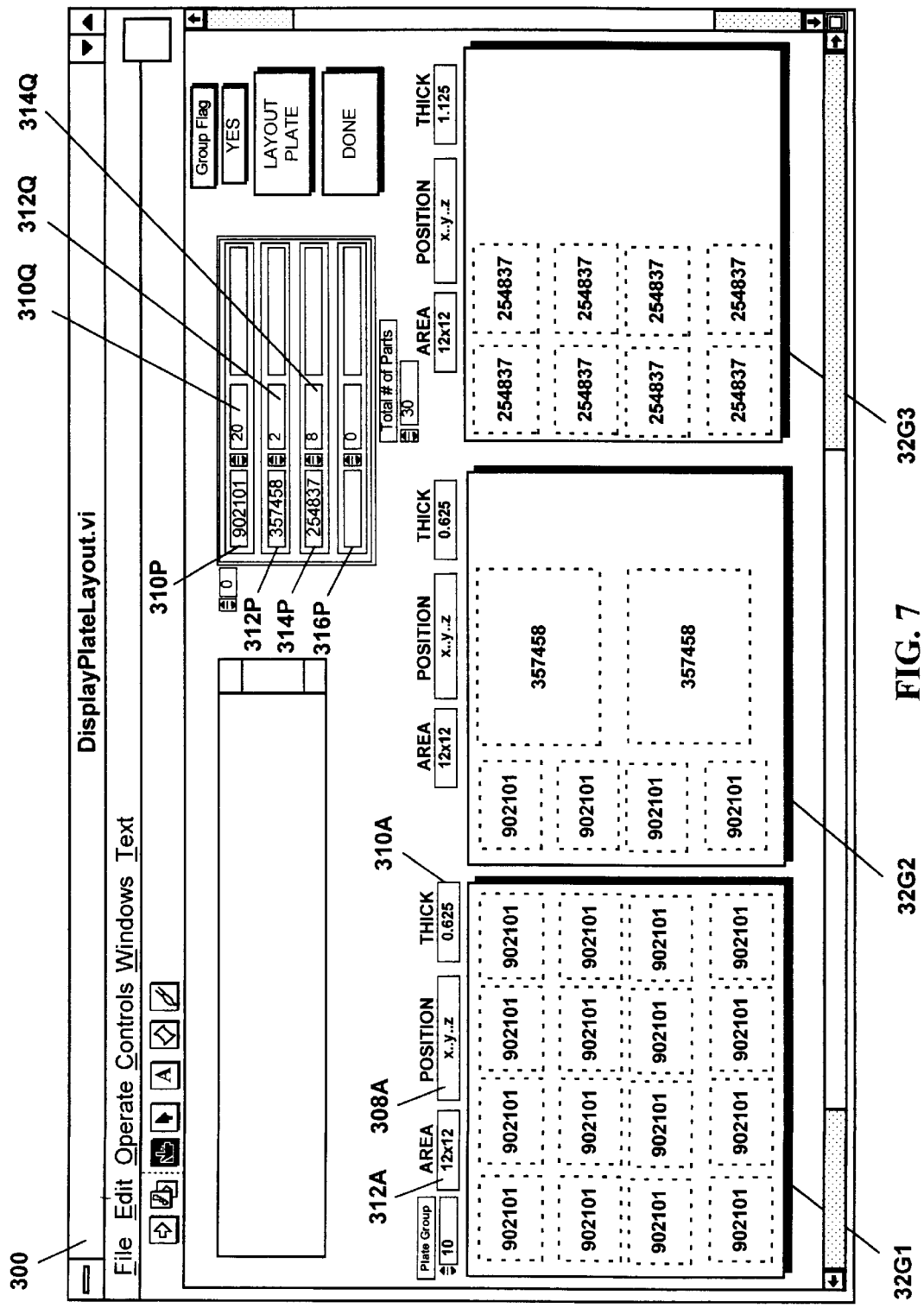
FIG. 7 shows the graphical user interface of FIG. 5 with a specific job layout.

FIG. 7 shows the part layout GUI 300 [see FIG. 5] with a proposed layout for the specific part numbers and quantities selected in FIG. 6D. Thus, part number field 310P shows part number 902101 selected in a quantity of 20 units in quantity field 310Q. Part number 357458 is shown in field 312P in a quantity of 2 units shown in field 312Q. Part number 254837 is shown in field 314P and is chosen in quantity field 314Q for a total number of units equaling 8. The total number of parts produced in this job run is shown in field 318 as 30 units. Part icons representing the actual layout for the parts are shown in work piece icons 32G1–3. Sixteen of part numbers 902101 are shown laid out in a 4×4 grid within work piece icon 32G1. The remaining four units of part number 902101 are arranged in a 1×4 column within work piece icon 32G2. Two of the part number 357458 are also shown in icon 32G2 in a 1×2 column to the right of the 902101 parts. Thus, all the parts that can be machined from 0.625" thick work pieces are placed on those work pieces 32G1–2. Placement is automatic. Finally, a 4×2 grid of icons is shown in icon 32G3. These icons correspond in scale to part 254837. The placement of these icons corresponds to the proposed placement for part number 254837. Thus, during the first phase of operation, the layout GUI 300 in conjunction with layout compiler 54 [see FIG. 2] has allowed a user to select parts and part quantities and has automatically located those parts on one of the available work pieces. In an embodiment of the invention, the user may use an input device such as a mouse to drag and place parts within either of the 3 work piece icons 32G1–3. This process would, of course, be subject to the same computational checks, i.e., area and tool limits discussed above.

Figures 8A, 8B:
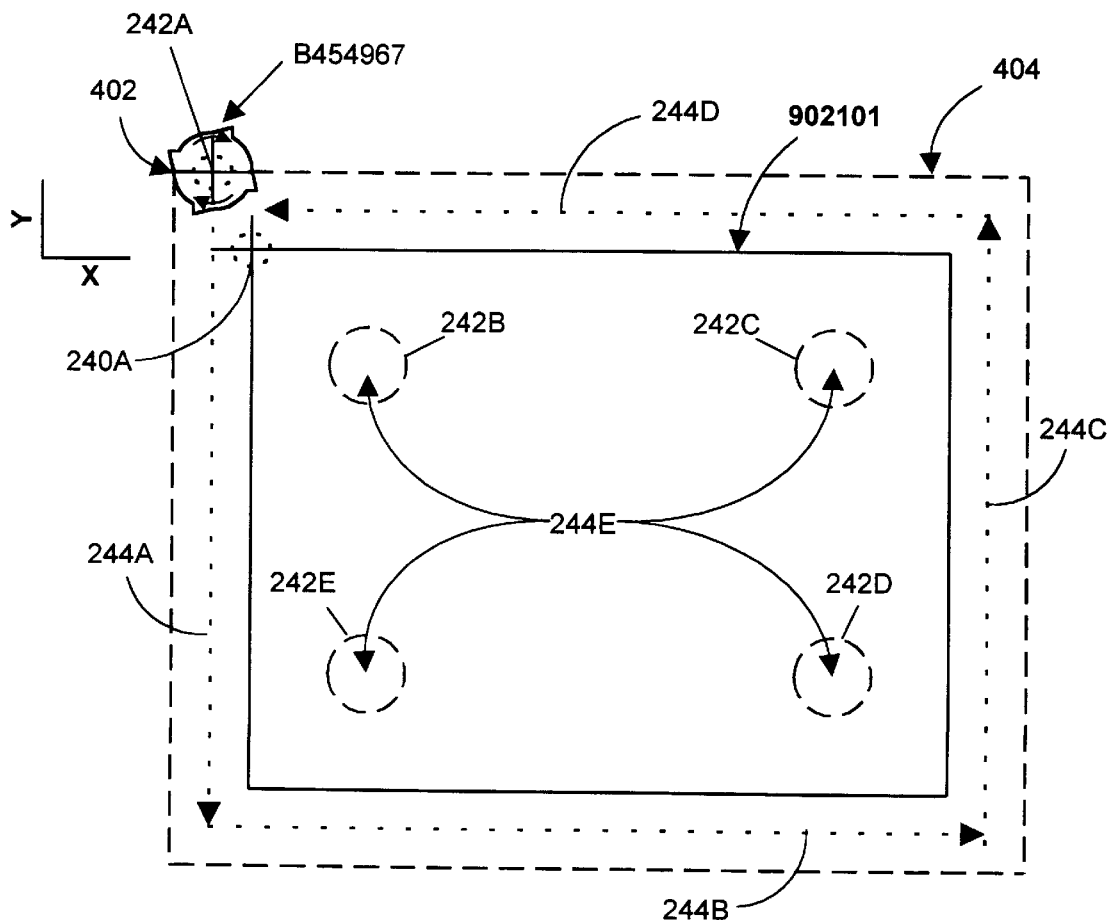
FIGS. 8A–B show a tool path record and a part machined using the record.

FIGS. 8A–B show respectively a G-code record 74B and a part machined from that record. G-code record 74B has been abbreviated to show only non-redundant items. The record includes offset fields 240, starting point fields 242, tool path/vectors 244, tool numbers 246. Four lines of G-code are shown for T001 and an additional 4 lines of code are shown for T002. T001 is, in this example, an end mill. T002 is, in this example, a drill. The part being machined is part number 902101. The offset field 240A has Cartesian coordinates (0.5, 0.5, 0.75). These indicate the offset of the upper left-hand corner of 240A of the completed part 902101 from the upper left-hand corner 402 of the material block 404 from which the part is machined. Field 242A lists the starting point for T001 as having Cartesian coordinates (0.25, 0.0, 0.0) relative to the upper left-hand corner 402 of the raw material block. From this starting point, a tool path 244 comprised of four vectors 244A–D is shown both in G-code form in FIG. 8A, and in terms of actual tool path in FIG. 8B.

After the milling operation is completed, the G-code for the T002, i.e., the drill, is executed. Execution begins on the first of the four lines. Starting point field 242B lists the starting point for the first drilling operation as (1, 1, 0). At this position, the tool follows a downward path along the Z-axis defined by tool path 244E as (0, 0, −0.2). As each of the remaining 3 lines are executed the drill is moved to each of the new starting points 242C, 242D and 242E, and at each of those positions traverses along tool path 244E, thereby placing four holes of equivalent depth within the completed part 902101.

Figure 9A:
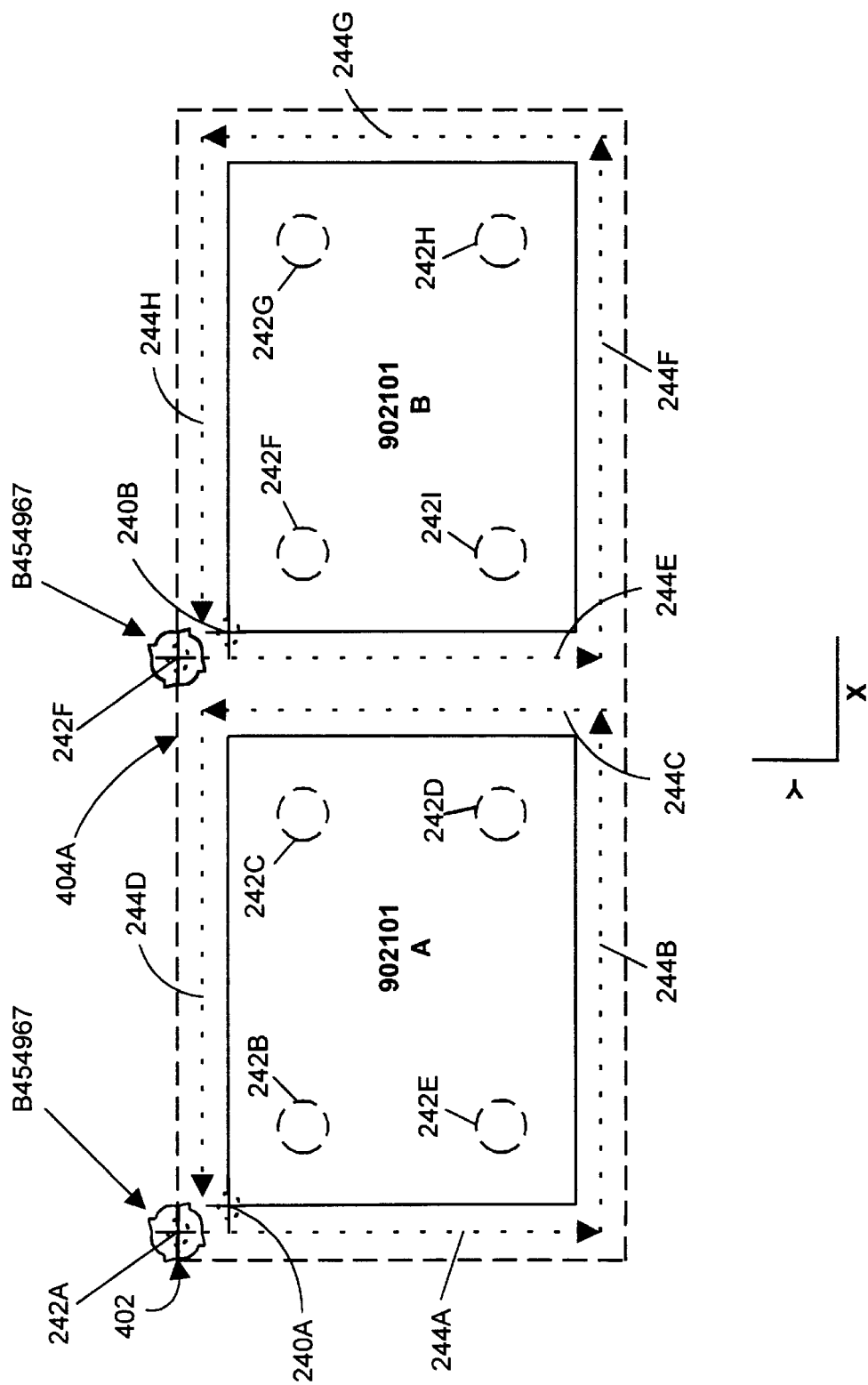

FIGS. 9A–B show the tool paths associated with machining more than one unit of a single part and the optimized G-code for accomplishing this result. In FIG. 9A two instances of the part shown in FIG. 8B are shown. Part 902101A is placed immediately adjacent on the left side of part number 902101B. Both parts will be machined from a single material block 404A. The upper left-hand corner 402 of material block 404A is referenced, as are the upper left-hand corners 240A–B of respectively parts 902101A–B. In an embodiment of the current invention, tool changeovers are minimized. Therefore, the vector/paths associated with end-mill B454967 operations on both parts are accomplished prior to any drilling operations. Thus, starting at start point 242A end-mill B454967 traverses tool paths 244A–D. Then the end-mill is moved to starting point 242F where it traverses tool paths 244E–H. Only after the end-mill operations have been completed, does a tool changeover take place. Under the direction of the G-code the combined drilling operations on both parts 902101A–B are accomplished. Thus, drilling is performed at starting points 242B–I. Without the G-Code optimization milling on part 902101A would be followed by drilling of that same part, which would be followed by milling and then drilling on part 902101B. Thus three tool changes would be required without tool change optimization as compared to one tool change with optimization.

FIG. 9B shows the optimized G-code record 74B–O associated with the machining operations discussed above in connection with FIG. 9A. The optimized G-code record includes; offset fields 240, starting point fields 242, tool path fields 244, tool number fields 246, and unique tool ID fields 248. The G-code cross compiler 58 [see FIG. 2] takes the G-code record 74B [see FIG. 8A] and couples it with the layout information obtained from the layout compiler 54 [see FIG. 2] to produce an optimized G-code. By optimization is meant the process of reducing the number of tool changes associated with the production of multiple parts. In the example shown in FIG. 9A, this means combining the portion of each G-code record which calls for the use of the same tool into one optimized G-code. This process requires the adjustment of the offset for each part which is expressed dimensionally relative to the upper left corner of the work piece. By adjusting offset 240B a single base G-code can be used for machining multiple units of the same or dissimilar parts. The adjustment can be made without the intervention of a skilled operator or programmer. In Cartesian coordinates, the offset for the second milling paths 244E–H is ((3.0+0.5), 0.5, 0.75]. This result is obtained by adding to the basic offset 240A an additional factor corresponding to the length 222 [see FIG. 4] by which the second part is displaced from the original offset point. Since all additional vectors 244 and starting points 242 are determined relative to this initial offset, no further correction to the base G-code is needed. This same process is followed for the subsequent drilling operation. In that instance, the holes to be drilled with respect to part 902101B are measured from a recalibrated offset 240B. After adjustment the offset 240B is ((3.0+0.5), 0.5, 0.75). Thus all drilling operations for the second part begin at the correct offset from the upper left-hand corner 402 of the raw material block 404A from which the two parts are to be machined.

Not only does this computational process which will be discussed in greater detail in the following FIGS. 10A–F and FIG. 11D reduce the number of tool changes required to machine multiple parts, but it also removes the requirement for a skilled programmer to determine the placement and tool path optimization for the machining of those parts. Additionally, because tool changeovers are minimized, machine time is reduced.

Figure 10D:
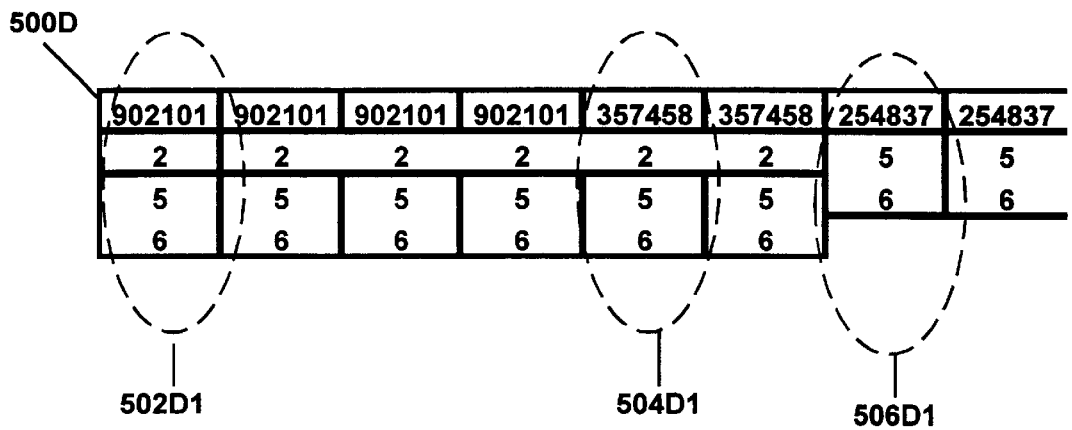

FIGS. 10A–F show the operation of the G-code cross compiler 58 [see FIG. 2] operating on the G-code records associated with 3 different parts: 902101, 357458, and 254837. In FIG. 10A the G-codes 500A for a job comprise: four units of part 902101, two units of part number 357458 and two units of part number 254837. Each of the G-codes has been reduced for illustrative purposes to a sequence of tool selections. For example, abbreviated G-code record 502A1 for part number 902101 shows the first machining operations performed by tool 1, the second operations performed by tool 2, and the cleanup operations performed by tools 5 and 6 in that order. Clean-up operations include, the final milling stages which separate the completed parts by an ultra-thin metal layer. This ultra-thin metal layer can be easily broken by hand to separate the individual parts and ready them for a simple de-burring operation. An abbreviated G-code record 504A1 for part 357458 is also referenced. This abbreviated record calls for tool 2 in the first position followed by a clean-up operation comprising tools 5 and 6 in that order. The final referenced abbreviated G-code record 506A1 is for part 254837. This record calls for tool 3 to perform the first machining operation, tool 4 to perform the second machining operation, tool 1 to perform the third machining operation, and a clean-up operation to be performed by tools 5 and 6 in that order.

In contrast to the examples shown in FIGS. 9A–B of multiple instances of the same part, FIGS. 10A–F will set forth the processes for tool changeover minimization associated with a machine part list comprised of multiple instances of multiple parts. In selecting which tool to be first selected for the machining of the multiple parts, the parts record having the greatest number of tool changes is selected as a starting point. Using this criteria on FIG. 10A tool 3 will be the first tool selected for the machining operation because record 506A1 has the greatest number of tool changes. The G-code and offset calculations connected with tool 3 form the first entries in the optimized G-code file 80 [see FIG. 2]. Once the portion of a G-code record for a given tool has been downloaded to the optimized G-code file it is no longer part of subsequent optimization processes.

In FIG. 10B the remaining G-codes 500B for the job are shown. G-code(s) associated with tool 3 has been removed, since the portion of the base G-code associated with that tool has been appended to the optimized G-code record. At this point, both records 506B1 and 502B1 for respectively parts 254837 and 902101 have an equal number of remaining, unoptimized tool changes. In the example shown, tool 4 is selected next. In choosing which tool and associated G-code to select among tool sequences of equal length any selection is appropriate. The G-code associated with tool 4, which appears in parts 254837 has the appropriate offsets calculated and is appended to the entries in the optimized G-code file 80.

In FIG. 10C the remaining G-codes 500C are shown. G-codes associated with tool 4 have been removed, optimized, and appended to the optimized G-code record. The G-code record with the most remaining tool changes is record 502C1 for part number 902101. Tool 1 is in the next tool in this record. Additionally, record 506C1 associated with an instance of part 254837 also has tool 1 in the first position, as well. Therefore, the next G-codes to be downloaded with appropriate offsets are those associated with tool 1, with respect to all the units of parts 902101 and 254837.

The remaining G-codes 500D to be optimized are those shown in FIG. 10D. Record 502D1 associated with part 902101 and record 504D1 associated with part 357458 both show tool 2 in the first position. Therefore, the G-code with appropriate offsets for all instances of tool 2 in the first position, in these two parts, is downloaded to the optimized G-code file 80.

Figure 10E:
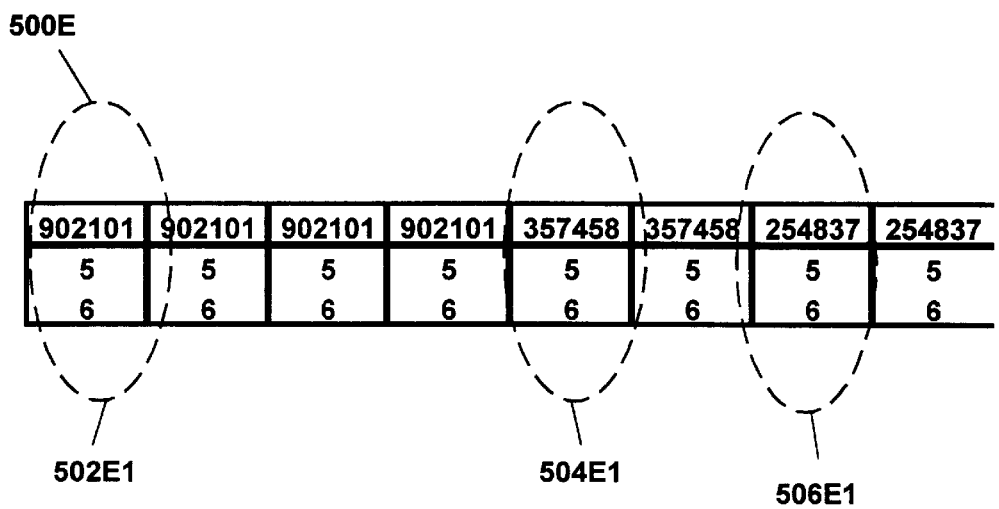

The resultant situation is shown in remaining G-code 500E in FIG. 10E. In FIG. 10E only clean-up operations exist in any of the referenced records 502E1, 504E1 and 506E1. Thus, the G-code and offsets associated with tools 5 followed by tools 6 are recalculated and downloaded to the optimized G-code 80. The resultant situation is shown in FIG. 10F.

Figure 10F:
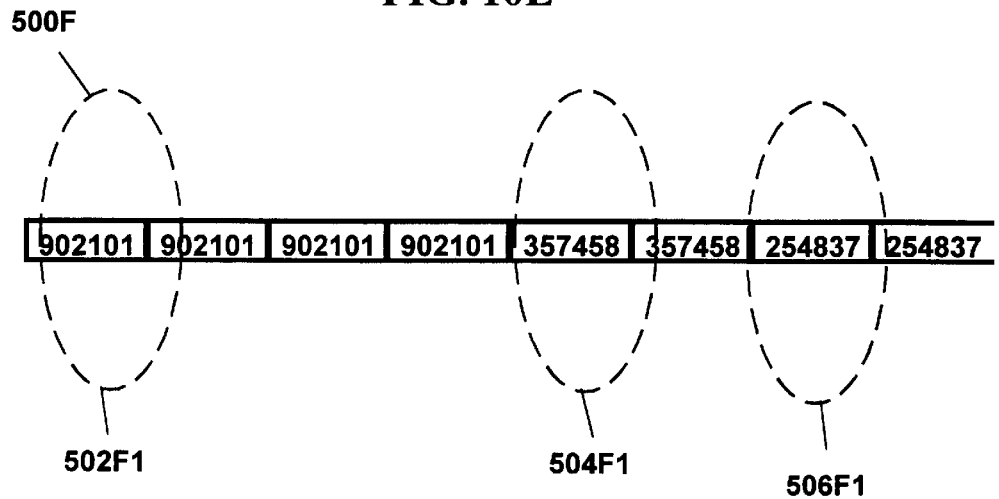

In FIG. 10F the remaining G-codes 50OF include no further machining operations. No G-code remains uncompiled with respect to any of the instances of parts 902101, 357458 or 254837. Thus, the number of tool changes has been reduced to a minimum. Note, that at no time was the tool order sequencing of any of the records violated. For example, in FIG. 10B tool 1 appeared in the remaining first position with respect to record 502B1 and associated instances. Tool 1 also appeared with respect with record 506B1 but was shown in the second position after tool 4, which was in the remaining first position. Because the ordering of tooling in a machining process is critical, tool 1 in record 506B1 was not cross-compiled with the code for tool 1 in record 502B1.

FIGS. 11A–D are process flow diagrams associated respectively with part selection, part layout, tool change optimization and tool turret compilation.

Figure 11A:
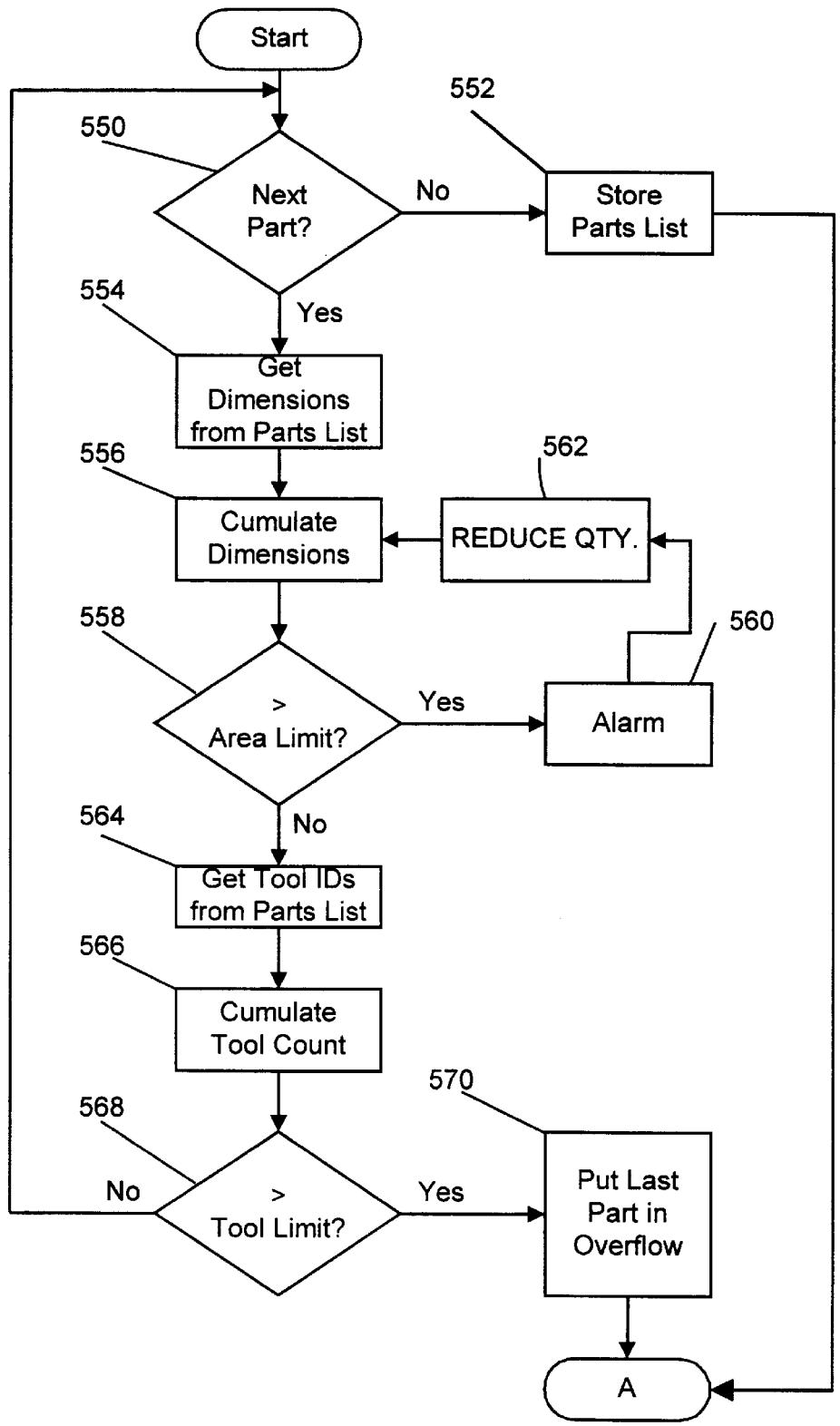
FIGS. 11A–D show the processes for part layout and tool optimization of the current invention.

FIG. 11A lists the processes shown graphically in FIGS. 6A–D for the selection of part number and quantity for a specific job. Commencing at the start block, control is passed to the decision process 550. In decision process 550 a determination is made as to whether the user has entered another part for the proposed job. In the event that determination is in the negative, i.e., that the user has finished selecting parts, then control passes to process 552 in which a parts list comprised of all the selected parts is downloaded and stored in the machine parts list file 76 [see FIG. 2]. Control is then passed to splice lock A. Alternately, if in decision process 550, an affirmative determination is made, i.e., that the user has selected an additional part, then control is passed to process 554. In process 554, the dimensions for the raw material block/work piece from which the part will be machined are obtained from the parts list 70 [see FIG. 2]. Control is then passed to process 556. In process 556 the part is matched to an appropriate work piece on the basis of its thickness and the remaining area on the work piece. As each part is added to the work piece, the cumulative area of the part and all predecessor parts associated with the job for each specific plate is recalculated. Control is then passed to decision process 558.

In decision process 558, a determination is made as to whether the area limit for any one or all of the three work pieces is exceeded. In the event that determination is in the affirmative, i.e., that the last selected part(s) cannot fit in the available work piece(s) control is passed to process 560. In process 560, an area over limit alarm 320 [see FIG. 6B] is graphically displayed to the user. Control is then returned to process 562. In process 562 reduced quantity figures entered by the user are sensed and control is passed to process 556 in which area limits are recalculated.

Alternately, if in decision process 558, a negative determination is reached, i.e., that area limits have not been exceeded as a result of the last part(s) selected, then control is passed to process 564. In process 564, tool IDs associated with the chosen parts are obtained from parts list 70 [see FIG. 2]. The control is then passed to 566. In process 566 the cumulative tool count is updated to reflect the total number of unique tools associated with all the parts chosen above in decision process 550. For example, if the first part requires four tools (1,2,5,6) and the second part requires six tools (1,2,3,4,5,6) the cumulative tool count would be six unique tools, i.e. (1,2,3,4,5,6). Control is then passed to decision process 568. In decision process 568, the cumulative tool count is compared with the number of pockets available on the carousel or multi-spindle turret. If a determination in the affirmative is reached, i.e., that the tool count exceeds the number of pockets available, then control is passed to process 570. In process 570, the last part added in decision process 550 is placed in overflow file 78 [see FIG. 2]. Control is then passed to splice block A. Alternately, if in decision process 568 a determination in the negative is reached, i.e., that the last part chosen did not result in tooling requirements which exceeded the carousel/turret tool limits, then control returns to decision process 550 for selection of the next part.

Figure 11B:
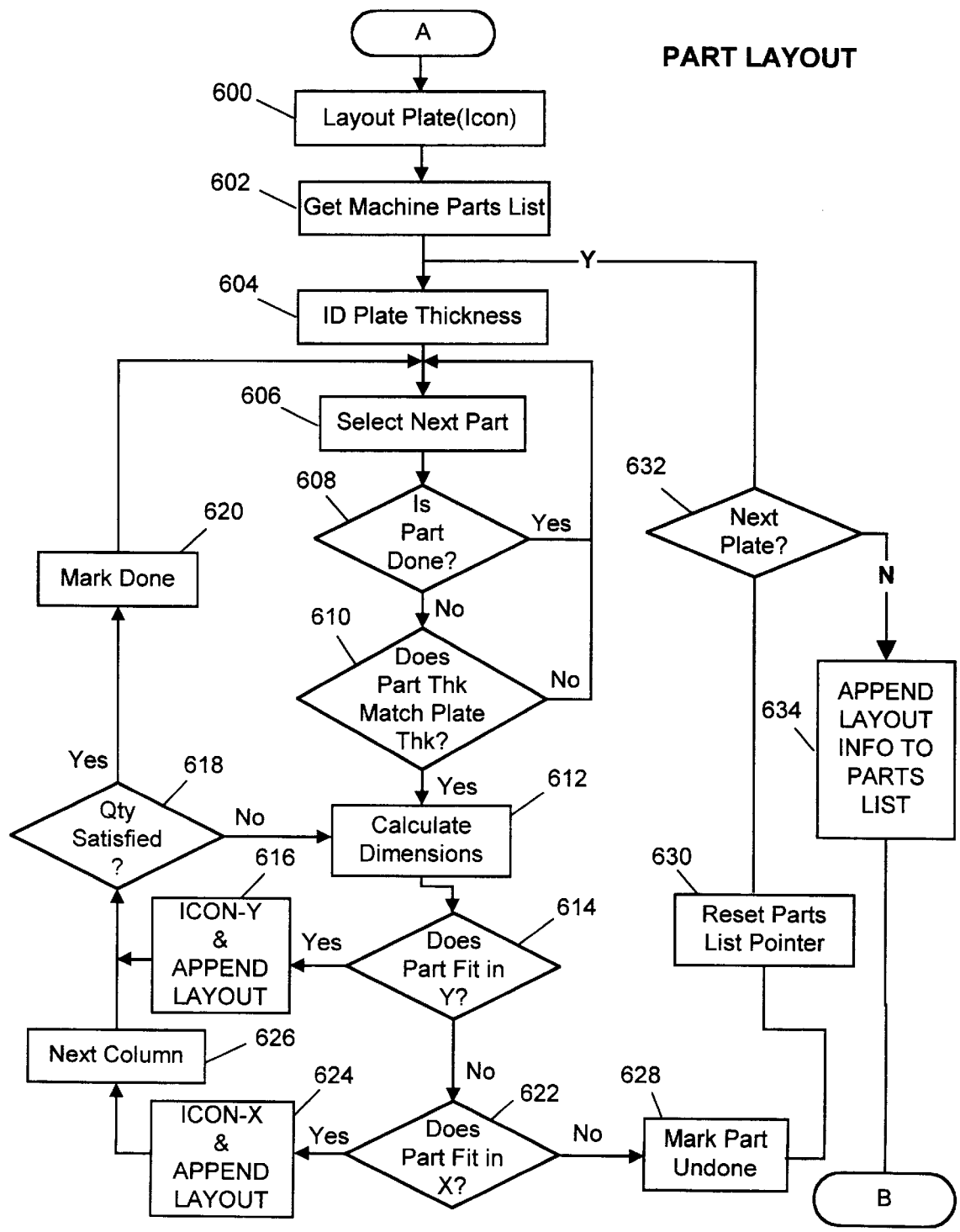

FIG. 11B shows the processes associated with the parts layout as performed by the layout compiler 54 [see FIG. 2] and as shown graphically in FIG. 7. Processing commences at splice block A and control passes to process 600. In process 600 icons associated with each work piece are placed in the GUI. In FIG. 7 these are shown as work piece icons 32G1–G3. These icons have the same scale as the actual work pieces that they represent. That scaling is the result of the dimensional information for each plate entered by the user in 308A–312A [see FIG. 7]. Control is then passed to process 602. In process 602 the machine parts file 76 [see FIG. 2] is uploaded by layout compiler 54 [see FIG. 2]. Control is then passed to process 604. In process 604, the thickness for the first work piece is determined on the basis of user information entered in 310A[see FIG. 7]. Control is then passed to process 606. In process 606, the next part on the machine parts list is obtained. Control is then passed to decision process 608. In decision process 608, a determination is made as to whether the part selected above in process 606 has already been graphically laid out, i.e., if it is tagged as "Done". In the event that determination is in the affirmative, i.e., the part is tagged "Done", control returns to process 606 for selection of the next part on the list.

Alternately, in the event that determination is in the negative i.e., that the selected part has not yet been graphically laid out, i.e., is not done, then control is passed to decision process 610. In decision process 610 a determination is made as to whether the selected part matches in thickness the thickness of the work piece currently being processed. Parts which do not call for a material thickness exceeding the plate thickness and which do not call for a thickness less than the plate thickness by an amount greater than an eighth of an inch will "match" the plate thickness. All other parts will result in a negative result. In the event of a negative result, control returns to process 606. In the event of an affirmative result, in decision process 610, control is passed to process 612. In process 612 the dimensions of the raw material stock required for the selected part are compared with the remaining dimensions on the workpiece being processed. Control is then passed to decision process 614. In decision process 614 a determination is made as to whether the part can be fit along the Y dimension, i.e., beneath (in the same column as) an existing part on the current plate layout. Thus, in this embodiment parts are laid out in column order from top to bottom and from left to right within each work piece. In the event a determination in the affirmative is reached in decision process 614, i.e., that the part can be placed in the Y dimension, then control is passed to process 616. In process 616, an icon corresponding to the outer dimensions of the raw material stock associated with the part is placed on the GUI in the intended location of the part [see FIG. 7]. Additionally, the coordinates of the proposed location expressed as an offset from a reference point, e.g., the upper left corner of the work piece are temporarily stored in a layout list which cumulates the layout information for each part as it is placed. Control is then passed to decision process 618.

In decision process 618, a determination is made as to whether the quantity selected for the part being processed has been satisfied. In the event that determination is in the negative, control returns to process 612. Alternately, if a determination in the affirmative is reached, i.e., that the quantity has been satisfied, then control passes to process 620 in which the part is marked "done". Control then returns to process 606 for selection of the next part.

Alternately, if in decision process 614 a negative determination is reached, i.e., that the part will not fit in the current column on the plate being laid out, then control is passed to decision process 622. In decision process 622 a determination is made as to whether the part can be fit in the X dimension. In other words, in the next column over on the plate being laid out. If this determination is in the affirmative then control is passed to process 624. In process 624, an icon representing the placement of the part in the next column over is placed on the GUI. Additionally, the coordinates of the proposed location expressed as an offset from the reference point, e.g., the upper left corner of the work piece, are temporarily stored in the layout list. Control is then passed to process 626 in which the next column is chosen on the part being laid out. Control is then passed to decision process 618.

Alternately, if in decision process 622 a negative determination is reached, i.e., that the part will not fit in the X dimension of the plate being laid out, then control is passed to process 628. In process 628, the part is marked "undone" and control is then passed to process 630. In process 630 a parts list pointer is reinitialized to the top of the list and control is passed to decision process 632. In decision process 632, a determination is made as to whether there are any remaining plates on the work platform, i.e., plates correspondingly displayed graphically on user interface 300. [see FIG. 7]. In the event this determination is in the affirmative, then control returns to process 604 in which the plate thickness of the next plate/work piece is determined. Alternately, if in decision process 632, a negative determination is reached, i.e., that there are no remaining work pieces available, then control is passed to process 634. In process 634 the layout information that has been accumulated in either of processes 616 or 624 is appended to the layout information in the machine parts list 76 [see FIG.2]. This information allows the offset corrections to be calculated by the G-code cross compiler 58 [see FIG. 2]. Control is then passed to splice block B.

Figure 11C:
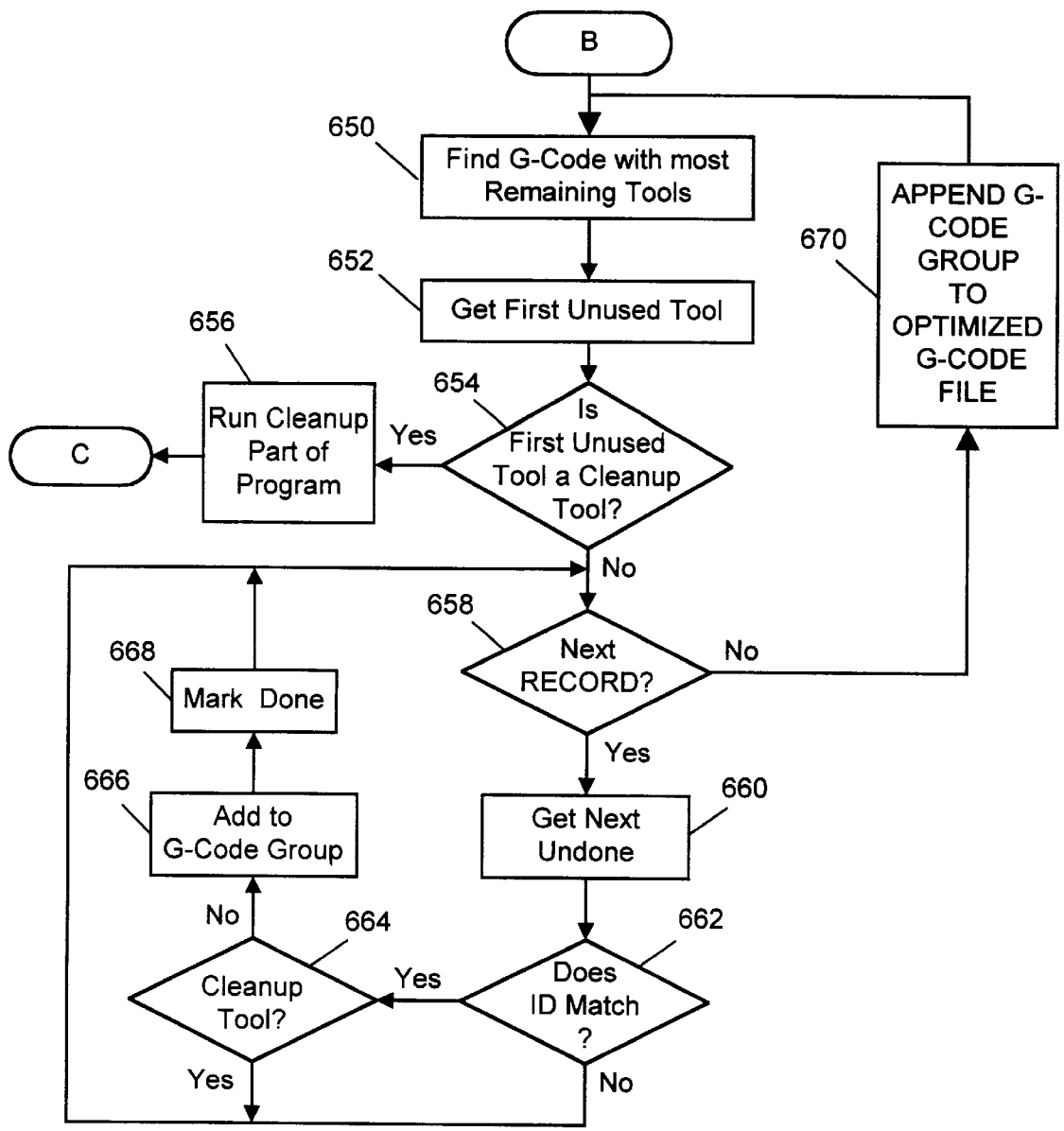

FIG. 11C shows the tool change minimization processes accomplished by tool change optimizer 56 and G-code cross-compiler 58 [see FIG. 2] as shown in FIGS. 9A–B and 10A–F. Operation commences at splice block B from which control is passed to process 650. In process 650 the G-code record with the most remaining uncompiled tool segments is determined. Control is then passed to process 652. In process 652, the first unused tool in that record is selected. Control is then passed to decision process 654. In decision process 654, a determination is made as to whether the first unused tool in the longest record, is a cleanup tool, e.g., tools 5–6 in the example shown in FIGS. 10A–F. If a determination in the affirmative is reached, i.e., that the first unused tool in the record is a cleanup tool, then control passes to process 656. In process 656, the cleanup operations are appended to the optimized G-code file. Then control is passed to splice block C.

Alternately, if in decision process 654, a negative determination is reached, i.e., that the unused tool is not a cleanup tool, then control is passed to decision process 658.

In decision process 658, a determination is made as to whether there are remaining G-code records in addition to the one being processed to be analyzed. If this determination is in the negative, then control is passed to process 670. In process 670 the G codes for the unused tool determined in process 652 and for all records having an identical tool in the first unused position are appended to the optimized G code file 80 [see FIG. 2]. Control then returns to process 650.

Alternately, if in decision process 658, a determination is made that other G-codes records remain to be processed, then control is passed to process 660. In process 660 the ID for the first tool in the unoptimized portion of the G code of the next record is obtained. Control is then passed to decision process 662. In decision process 662, a determination is made as to whether the ID for the tool obtained in process 660 matches the ID for the tool obtained in process 652. In the event that determination is in the affirmative, control is passed to decision process 664. In decision process 664, a determination is made as to whether the tool is marked as a cleanup tool. If it is marked as a cleanup tool, then it is not to be compiled until all records have been reduced to cleanup tools, and control returns to decision process 658. Alternately, if the tool is not marked as a cleanup tool, then control is passed to process 666. In process 666 the G-Code for that tool and that record is added to a G-code group. The G-code group comprises all tool segments selected from all the records which match as to both tool ID and placement in the first remaining position in each record. Control is then passed to process 668. In process 668 the G-code associated with that tool and the record being processed is marked as "done", i.e., optimized. Control then returns to decision process 658.

Alternately, if in decision process 662, a negative determination is reached, i.e., that the tool ID for the tool in the first position on the next record being processed does not match the first unused tool determined in process 652, then control returns to decision process 658. Similarly if in decision process 664, determination is reached that the selected tool, in the record being processed is marked as a cleanup tool, then control also returns to decision process 658.

Figure 11D:
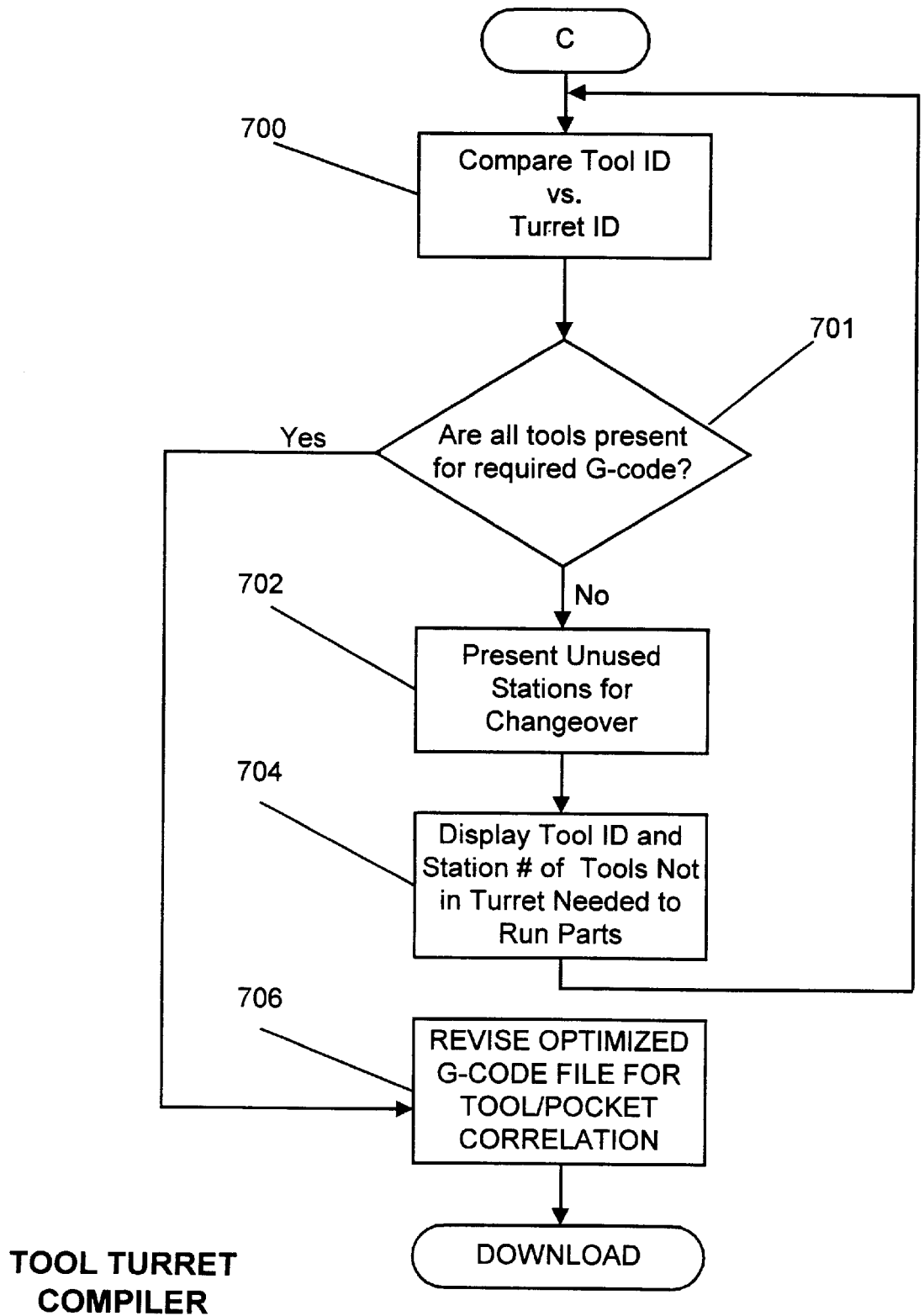

FIG. 11D shows the processes associated with tool turret compiler 60 [see FIG. 2]. These processes verify that actual tools in the carousel/turret match the tools required for the job. In addition these processes update the optimized G-code file 80 [see FIG. 2] to reflect the pocket-tool relationships. Processing begins at splice block C and control passes to process 700. In process 700 the turret or carrousel is indexed through all possible positions and identification information is obtained for each tool actually on the machine. This information is then compared to the tool information contained in the optimized G-code file 80 [see FIG. 2]. Control is then passed to process 701. In decision process 701, a determination is made as to whether all the tools required for the optimized G-code are resident in the turret. If a determination in the affirmative is reached, i.e., that all required tools are resident on the turret, then control passes to process 706. In process 706, the optimized G-code file has appended to it a correlation between all the tools required for the job and the specific pocket on the carrousel or spindle in which they reside.

Alternatively, if in decision process 701, a negative determination is reached i.e, that all required tools for the optimized G-code are not resident on the turret, then control is passed to process 702. In process 702, carrousel pockets and/or spindles on a multi spindle turret which contain tools not required for the job are identified for and presented to the user. Via a GUI, the user is prompted to remove tools not needed for the current job. Control is then passed to process 704. In process 704, the user is again graphically prompted to place the remaining tools need for the current job in the available pockets and/or spindles. Control is then passed to process 706. In process 706, the optimized G-code file has appended to it a correlation between all the tools required for the job and the specific pocket on the carrousel or spindle in which they reside. Control is then passed to the downloading operations accomplished by download module 62 [see FIG. 2].

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A controller for machining parts on a work piece positioned on a numerically controllable (NC) machine, said controller comprising:

a memory for a plurality of machine instruction records, and each of the plurality of machine instruction records corresponding to a specific part and including;

a) a part name;

b) a dimension for the named part; and c) name tools required to machine the part;

a display for displaying a job textually as a job list of parts and quantities, and for displaying the job graphically in a scaled layout in which a plurality of part icons corresponding to each of the parts on the job list are superimposed on a work piece icon in an arrangement corresponding to a physical part layout; and a plurality of layout processes for execution on the controller, including layout processes for locating the machine instruction records in said memory which correspond to each of the plurality of parts for the job, for determining a dimension of the work piece and scaling the work piece icon, for scaling each of the part icons on said display in proportion to the dimension of the named part in each of the corresponding machine instruction records, and for locating each of the part icons on the work piece icon in the scaled layout corresponding to a physical layout.

2. The controller of claim 1, further comprising;

a plurality of unique tool identifiers to attach to each of a plurality of available tools for the NC machine; and a plurality of tool identification processes for determining the tools required for the job on the basis of the plurality of named tools in each of the machine instruction records for the job, for identifying which of the plurality of available tools are mounted on the NC, and for directing an operator as to which of the plurality of available tools to substitute for a selected one of tools mounted on the NC to prepare the NC machine for the job.

3. The controller of claim 1, wherein each of the plurality of machine instruction records further includes;

d) a tool order list of the tool order in which each of the named tools machines the work piece; and e) a plurality of machine paths defining the path traversed by each of the named tools to machine the work piece; and a plurality of download processes for gathering the plurality of machine paths for all of the tools for all of the machine instruction records associated with the job, for adding an offset to the machine paths corresponding to the physical layout of each part on the work piece, and for downloading a resultant machine instruction file to the NC machine.

4. The controller of claim 3, wherein said plurality of download processes further comprise:

a plurality of job optimization processes for optimizing the machine instruction file by arranging the contents of the file to minimize the number of tool changes during the machining of the job by concurrent usage of each of the plurality of named tools in each of the plurality of machine instruction records on as many of the parts in the job as possible, without violating the tool order in any one of the machine instruction records associated with the job.

5. The controller of claim 1, wherein the display further comprises;

a work piece dimension input area; and the layout processes further include processes for accepting user input of a work piece dimension for a work piece on the NC machine in the work piece dimension input area and for scaling the work piece icon correspondingly.

6. The controller of claim 1, wherein the display further comprises;

a part number and quantity area; and the plurality of layout processes further comprise, processes for displaying a list of parts corresponding to each part name in said records, for selecting parts from the list, for selecting a quantity for each of the selected parts, and for displaying each of the selected parts and corresponding quantities in the part number and quantity input area.

7. The controller of claim 1, further comprising:

an area overflow prompt for indicating that a job can not be machined on the work piece due to area limitations; and the layout processes further comprising, processes for determining an area of the work piece, for determining the total layout area required by the job on the basis of the dimensions for the named part in each of the machine instruction records for the job, and for enabling the area overflow prompt when the total layout area exceeds the area of the work piece.

8. The controller of claim 1, further comprising:

a mounted tool limit prompt for indicating that a job can not be machined on the NC machine due to tooling limitations; and the layout processes further comprising, processes for determining a maximum tool mounting capability on the NC machine, for determining the total number of tools required to machine all the parts of the job on the basis of the named tools required to machine the named part in each of the machine instruction records for the job, and for enabling the mounted tool limit prompt when the total number of tools required exceeds the maximum tool mounting capability of the NC machine.

9. A method for machining parts from a work piece positioned on a numerically controllable (NC) machine, the method utilizing a database of machine instruction records for each of a plurality parts, each of which records includes a part name, a part dimension, a tool name and sequence for each tool required to machine the part, and a plurality of machine paths traversed by each of the tools, said method comprising the acts of:

defining a job as a selected subset of the plurality of parts and as a corresponding quantity for each part of the selected subset;

locating the machine instruction records in the database which correspond to the selected subset of the plurality of parts;

graphically displaying a work piece icon corresponding in scale to an actual dimension of the work piece;

determining the dimensions of each part in the job on the basis of the part dimension in the located machine instruction records;

calculating a selected physical location on the work piece, for each part in the job; and graphically superimposing a scaled part icon on the work piece icon at each of the selected locations in a scaled layout approximating an actual physical layout of the job on the work piece.

10. The method for machining parts of claim 9, further comprising the acts of:

determining a required set of tools for the job on the basis of the tool names in each of the machine instruction records for the job, identifying an available set of tools corresponding to tools mounted on the NC; and directing an operator as to which one of the required set of tools to substitute for a selected one of the available set of tools to prepare the NC machine for the job.

11. The method for machining parts of claim 10, further comprising the acts of:

compiling a machine instruction file including the plurality of machine paths for all of the tools on the tool order lists of all of the machine instruction records associated with the job;

correcting each of the plurality of machine paths in the machine instruction file with an offset corresponding to the physical layout of each part on the work piece.

12. The method for machining parts of claim 11, further comprising the acts of:

downloading the machine instruction file to the NC machine.

13. The method for machining parts of claim 11, further comprising the acts of:

optimizing the machine instruction file by arranging the contents of the file to minimize the number of tool changes during the machining of the job by concurrent usage of each of the plurality of named tools in each of the plurality of machine instruction records on as many of the parts in the job as possible, without violating the tool order in any one of the machine instruction records associated with the job.

14. The method for machining parts of claim 11, further comprising the acts of:

determining a maximum tool mounting capability on the NC machine;

determining the total number of tools required to machine all the parts of the job on the basis of the named tools required to machine the named part in each of the machine instruction records for the job; and enabling a mounted tool limit prompt when the total number of tools required exceeds the maximum tool mounting capability of the NC machine.

15. The method for machining parts of claim 9, further comprising the acts of:

accepting user input of a dimension for the work piece; and scaling the work piece icon correspondingly.

16. The method for machining parts of claim 9, further comprising the acts of:

displaying a list of parts corresponding to each part name in said record;

providing for the selection of parts from the list;

providing for the selection of a quantity for each of the selected parts; and displaying each of the selected parts and corresponding quantities.

17. The method for machining parts of claim 9, further comprising the acts of:

determining an area of the work piece;

determining the total layout area required by the job on the basis of the dimensions for the named part in each of the machine instruction records for the job; and enabling an area overflow prompt when the total layout area exceeds the area of the work piece.

18. A computer usable medium having computer readable program code means embodied therein for machining parts from a work piece positioned on a numerically controllable (NC) machine, the computer readable program code means for causing a computer to utilize a database of machine instruction records for each of a plurality parts, each of which records includes a part name, a part dimension, a tool name and sequence for each tool required to machine the part, and a plurality of machine paths traversed by each of the tools, the computer readable program code means in said article of manufacture comprising:

computer readable program code means for causing a computer to define a job as a selected subset of the plurality of parts and as a corresponding quantity for each part of the selected subset;

computer readable program code means for causing a computer to locate the machine instruction records in the database which correspond to the selected subset of the plurality of parts;

computer readable program code means for causing a computer to graphically display a work piece icon corresponding in scale to an actual dimension of the work piece;

computer readable program code means for causing a computer to determine the dimensions of each part in the job on the basis of the part dimension in the located machine instruction records;

computer readable program code means for causing a computer to calculate a selected physical location on the work piece, for each part in the job; and computer readable program code means for causing a computer to graphically superimpose a scaled part icon on the work piece icon at each of the selected locations in a scaled layout approximating an actual physical layout of the job on the work piece.

* * * * *